US010438415B2

(12) United States Patent
Hendricks et al.

(10) Patent No.: US 10,438,415 B2
(45) Date of Patent: Oct. 8, 2019

(54) SYSTEMS AND METHODS FOR MIXED REALITY MEDICAL TRAINING

(71) Applicant: Unveil, LLC, Cincinnati, OH (US)

(72) Inventors: John Gerald Hendricks, Cincinnati, OH (US); Jason Todd Van Cleave, Cincinnati, OH (US)

(73) Assignee: UNVEIL, LLC, Cincinnati, OH (US)

( * ) Notice: Subject to any disclaimer, the term of this patent is extended or adjusted under 35 U.S.C. 154(b) by 6 days.

(21) Appl. No.: 15/947,501

(22) Filed: Apr. 6, 2018

(65) Prior Publication Data

US 2018/0293802 A1    Oct. 11, 2018

Related U.S. Application Data

(60) Provisional application No. 62/483,171, filed on Apr. 7, 2017.

(51) Int. Cl.
| | |
|---|---|
| *G06T 19/00* | (2011.01) |
| *G09B 23/30* | (2006.01) |
| *G09B 5/02* | (2006.01) |
| *H04B 7/24* | (2006.01) |

(52) U.S. Cl.
CPC .............. *G06T 19/006* (2013.01); *G09B 5/02* (2013.01); *G09B 23/30* (2013.01); *G06T 2210/41* (2013.01); *H04B 7/24* (2013.01)

(58) Field of Classification Search
None
See application file for complete search history.

(56) References Cited

U.S. PATENT DOCUMENTS

| | | | | |
|---|---|---|---|---|
| 2009/0263775 | A1* | 10/2009 | Ullrich ................ | G09B 23/285 434/267 |
| 2011/0306025 | A1* | 12/2011 | Sheehan ............... | A61B 8/523 434/267 |
| 2014/0256438 | A1* | 9/2014 | Grant .................... | A63F 13/10 463/36 |

(Continued)

FOREIGN PATENT DOCUMENTS

| | | |
|---|---|---|
| CN | 104992582 A | 10/2015 |
| WO | 2015027286 A1 | 3/2015 |

OTHER PUBLICATIONS

International Search Report and Written Opinion of the International Searching Authority for International Patent App. No. PCT/US2018/026560 dated Aug. 2, 2018; 6 pages.

*Primary Examiner* — Tize Ma
(74) *Attorney, Agent, or Firm* — Ulmer & Berne LLP

(57) ABSTRACT

A method for training a student in medical condition identification and intervention. The method can include the step of providing a mixed reality viewing device, providing a computing device, providing a physical object, storing a medical condition scenario in memory of the viewing device, storing the scenario in the memory of the computing device, anchoring a virtual image of at least a portion of a virtual patient on at least a portion of the physical object, selecting the scenario, commanding the processor of the computing device to initiate displaying the virtual image in a selected one of a plurality of stages, controlling one or more states and one or more properties of the physical object, assessing the student's identification of the one or more virtual critical cues; and assessing the student's identification of the one or more physical critical cues.

7 Claims, 15 Drawing Sheets

(56) References Cited

U.S. PATENT DOCUMENTS

| | | |
|---|---|---|
| 2014/0347726 A1 | 11/2014 | Yang et al. |
| 2016/0262608 A1* | 9/2016 | Krueger ............... A61B 3/0041 |
| 2017/0213473 A1* | 7/2017 | Ribeira ............... G06F 19/3456 |

* cited by examiner

140

HOLOLENS   PATIENT
CONNECTED  REGISTERED

SETTINGS

← SELECT CONDITION

STUDENT                    STUDENT | Laura
Laura

INSTRUCTOR
Oliver

TRAINING INSTITUTION
Unveil

DATE OF TRAINING
Tuesday, February 13, 2018

Report

TOTAL PASSED
81%

REPORT

| Passed | Student Name | Condition | Stage | Cue |
|---|---|---|---|---|
| ✓ | Laura | Tension Pneumothorax & Extremity Blee | 3 | PulseOx |
| ✗ | Laura | Tension Pneumothorax & Extremity Blee | 4 | Cyanosis |
| ✓ | Laura | Tension Pneumothorax & Extremity Blee | 4 | JVD |
| ✓ | Laura | Tension Pneumothorax & Extremity Blee | 4 | ChestEntryW |
| ✓ | Laura | Tension Pneumothorax & Extremity Blee | 4 | BackExitWou |
| ✓ | Laura | Tension Pneumothorax & Extremity Blee | 4 | RighLegEntry |
| ✗ | Laura | Tension Pneumothorax & Extremity Blee | 4 | RighLegExit |
| ✗ | Laura | Tension Pneumothorax & Extremity Blee | 4 | TD |
| | Laura | Tension Pneumothorax & Extremity Blee | 4 | PulseOx |

SENSORY CONTENT
- Realistic Virtual Patient with Visual Cues
  - Animated Cues (face and skeletal motion)
  - Basic Medical Olfactory Cues (core set of scents)
  - Advanced Medical Olfactory Cues (extensive library of scents)
- Realistic Sound Cues
  - Motion Capture Cues (realistic face and skeletal motion)
  - Blended Cues (dynamic mixing of visual and motion cues)
  - Realtime Puppet Animation (dynamic face and skeletal control by instructor in realtime)
- Recorded Patient Voice Acting
  - Realtime Patient Voice Acting (instructor's voice with dynamic lipsynch)

USER DATA
- User Video Capture (record user's POV during simulation)
- User Data Capture (track gaze and interactions during simulation)
  - User Data Visualization (visualizations of student behavior created after a training session)
  - External Data Management (store, manage and review multiple users' videos and data through a web-based system)
  - Advanced Data Visualization (visualizations provided to the instructor during the simulation in real-time)
  - Advanced Data Capture (track the user's hands, eye gaze, facial expressions, pulse, blood pressure and physical activity)

TRAINING COURSEWARE
- Core Training (key TCCC scenarios)
  - NDM Expert Model (incorporate subject matter expertise in support of learning through reflection)
  - NDM Affordances (implement UX/IXD methods to support early stages of learning)
  - Comprehensive Training (complete library of scenarios covering the full range of TCCC training curriculum)
  - Non-linear Branching Scenarios (allow for complex scenarios with multiple patient outcomes)
  - Dynamic Scenarios (allow instructors to create scenarios using CMS tools)

VIRTUAL PATIENT REGISTRATION
- Markerless Patient Registration (manually align virtual patient to mannequin using 2 reference points)
  - Mixed Method Patient Registration (combine fiducial markers and markerless approaches to automatically align virtual patient to mannequin)
  - Manual Patient Registration (manually align patient to mannequin defining reference points at each of the mannequin's joints)
  - Dynamic Patient Registration (machine vision system aligns virtual patient and extremities to match mannequin in realtime)

COMMAND and CONTROL
- Remote Control Dashboard (control virtual patient using tablet or Windows computer)
  - Natural Language Processing (speech interactions with virtual patient)
  - Perpetual Computing Integration (incorporate hardware platforms to facilitate user interactions and mannequin registration)
  - Hand Gesture Detection (detect user hand operations with the physical mannequin)

TECHNOLOGY INTERACTIONS
- Olfactory Simulation Integration (connect to and control scent emitting hardware during simulation)
  - Mechanical Simulation Integration (consume events and telemetry from mechanical simulation mannequin)
  - Patient Personalization (allow just-in-time 3d face scanning integrated into existing virtual patient content)

SYSTEMS AND METHODS FOR MIXED REALITY MEDICAL TRAINING

REFERENCE TO RELATED APPLICATION

The present application is a U.S. non-provisional application that claims the priority benefit of U.S. provisional patent application Ser. No. 62/483,171, filed Apr. 7, 2017, and hereby incorporates the same application by reference in its entirety.

TECHNICAL FIELD

Embodiments of the technology relate, in general, to augmented and mixed reality technology, and in particular to augmented and mixed reality applications for medical training.

BACKGROUND

Between World War II and the beginning of modern conflicts in Iraq and Afghanistan, few improvements in combat medicine were made. Practices carried out on the battlefield during conflicts in Europe were indistinguishable from the procedures done in the jungles of Vietnam. In fact, deaths from controllable extremity hemorrhage during the Vietnam War and the beginning of Operation Enduring Freedom were virtually identical, claiming the lives of 7.9% of casualties. Many of the lessons learned in casualty care, including the use of tourniquets, analgesics and plasma, were not implemented into best practices and standards of care for battlefield providers. In 1993, under the authorization of the United States Special Operations Command, a study of combat casualty prehospital practices was conducted. Three years later, the findings of that study led to a revolution in combat medicine through the creation of Tactical Combat Casualty Care, or TCCC. The report concluded that correction of extremity hemorrhage, tension pneumothorax, and airway obstructions was not only feasible in the combat environment, but also successful in mitigating preventable deaths.

Implementation of TCCC principles across all branches of the Department of Defense (DoD) has been highly effective. In 1996 Col. Stanley McCrystal, then 75th Ranger Regimental Commanding Officer, mandated TCCC training for all personnel assigned to the Regiment. As a result, none of the Rangers killed in action died as a result of conditions addressed by TCCC preventable death protocols (Holcomb, 2009). Other commands have seen similar improvements in casualty survival rates, including the 101st Airborne Division, and several Special Operations Units. Recognizing both the impact of TCCC on survival rates, and the need for increased access to higher levels of care, Secretary of Defense Robert Gates mandated the extraction of wounded personnel within one hour of injury, shortening the time between application of TCCC and surgical level care. Building on these advances, there is an opportunity to create enhancements to combat medic training, particularly in the area of diagnosing and treating severe trauma.

Medical mannequins are well designed for practicing interventions for medical training, including for TCCC. Medical mannequin manufacturers continue to add features to provide mannequins with lifelike features.

However, more lifelike features in medical mannequins cannot alone address the problem of better medical training for practicing interventions. For example, medical mannequins cannot show shifts in skin tone with medical conditions, due to the materials used for the skin of the mannequins. Likewise, medical mannequins cannot show changes in cognition, such as eye or mouth changes with changing medical conditions. Mannequin eyes, for example, cannot signal confusion due to a prescribed underlying medical condition.

Accordingly, there is a continuing unaddressed need for systems, methods and apparatus for improved training for medical interventions.

Additionally, there is a continuing unaddressed need for systems, methods and apparatus for improving combat medical training, such as exemplified in TCCC.

Further, there is a continuing unaddressed need for systems, methods, and apparatus for presenting to a medical trainee a medical mannequin that can exhibit subtle visual, audible, and/or tactile cues with respect to changing medical conditions.

Further, there is a continuing unaddressed need for systems, methods, and apparatus for presenting to a medical trainee a medical mannequin combined with peripheral medical equipment useful for a medical trainee in making medical decisions.

Finally, there is a continuing unaddressed need for systems, methods, and apparatus for medical training on mannequins that can be easily transported, administered, monitored, and reviewed.

SUMMARY OF THE DISCLOSURE

A method for training a student in medical condition identification and intervention is disclosed. The method can include the step of providing a mixed reality viewing device, providing a computing device, providing a physical object, storing a medical condition scenario in memory of the viewing device, storing the scenario in the memory of the computing device, anchoring a virtual image of at least a portion of a virtual patient on at least a portion of the physical object, selecting the scenario, commanding the processor of the computing device to initiate displaying the virtual image in a selected one of a plurality of stages, controlling one or more states and one or more properties of the physical object, assessing the student's identification of the one or more virtual critical cues; and assessing the student's identification of the one or more physical critical cues.

BRIEF DESCRIPTION OF THE DRAWINGS

The present disclosure will be more readily understood from a detailed description of some example embodiments taken in conjunction with the following figures:

FIG. 22 depicts a screenshot from a command and control communication device according to one embodiment;

FIG. 24 depicts a chart showing a list of various features, uses, and systems that can be incorporated into embodiments.

DETAILED DESCRIPTION

Figure 1:
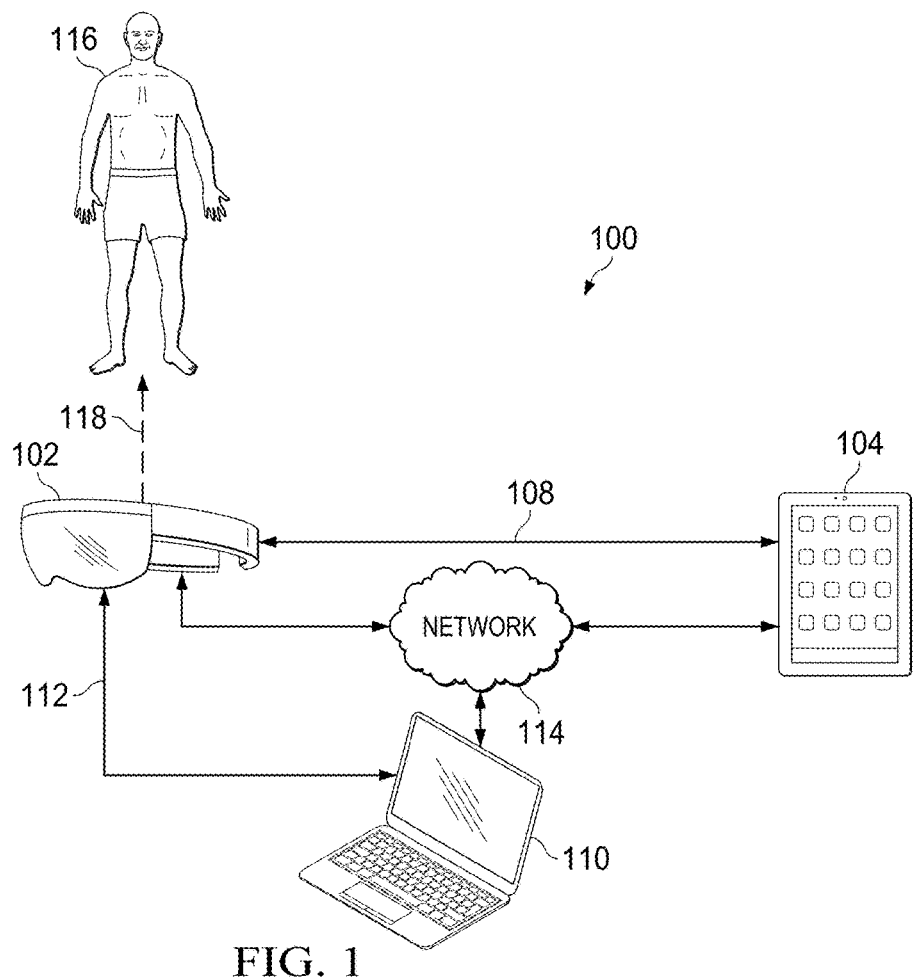
FIG. 1 depicts a schematic illustrating a system according to one embodiment.

Various non-limiting embodiments of the present disclosure will now be described to provide an overall understanding of the principles of the structure, function, and use of the medical training systems and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Described herein are example embodiments of computer-based systems, methods and apparatus training medical responders and for determining accurately how well medical professionals are trained. In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the Embodiments of the system and method can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signal.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

In one example embodiment, augmented reality can be used to evaluate a user's aptitude under real-life appearances and changing scenarios. In some embodiments, mixed reality can be used to evaluate a user's aptitude under real-life appearances and changing scenarios. In some embodiments, marker and markerless systems are used in the system and method described herein.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Deployed combat medics need cost-effective, hands-on refresher training that supports identification and treatment of common causes of preventable death in the field such as tension pneumothorax and airway obstruction. This training in most cases should be guided by instructional design principles and demonstrably improve learning outcomes. Recent advances in Augmented Reality (AR), mixed reality (MR), mannequin technology, and macrocognition measures focused on expert performance offer valuable opportunities to meet these needs.

The system and method disclosed herein can include a method for training a student in medical condition identification and intervention. That is, the system and method aids in teaching not only identification of visual cues in a patient, but also allows physical intervention steps to be performed in response to the perception of visual cues. Cues can be visual presentations to a user of a medical condition, state, or property, and can be predetermined for purposes of training assessment as "critical cues". In the present disclosure the system and method is described with reference to a "trainee," who is alternately referred to as a "student," "learner" or the like herein. Likewise, the system and method can be utilized by a trainer, who can be a teacher, instructor, assessor, or the like.

Referring to FIG. 1, in an embodiment of the present disclosure, a system 100 for medical training can include mixed reality wearable computer glasses, referred to generally as a mixed reality viewing device, which can be an augmented reality viewing device, a virtual reality viewing device or a mixed reality viewing device. In the embodiments disclosed herein the mixed reality viewing device can be head mounted and is referred to as herein as an XR device 102. The system 100 can also include a command and control computing device 104. The mixed reality XR device 102 can be communicatively connected to the command and control computing device 104, for example in a client server based relationship, by first communication link 108 in any suitable manner, including wired and wireless. The system for medical training can also optionally include a data capture computing system 110 that can be communicatively connected to the XR device 102 by second communication link 112 in any suitable manner, including wired and wireless. All apparatus components can be communicatively connected by wireless network 114 that can be a LAN network, including a 5G network.

XR devices can collect information from internal or external sensors and can control or retrieve data from other instruments or computers. XR devices can support wireless technologies like Bluetooth, Wi-Fi, and GPS. A XR device 102 can be a Microsoft HoloLens® head-mounted display. The HoloLens® can feature an inertial measurement unit (IMU) (which includes an accelerometer, gyroscope, and a magnetometer), four "environment understanding" sensors (two on each side), an energy-efficient depth camera with a 120°×120° angle of view, a 2.4-megapixel photographic video camera, a four-microphone array, and an ambient light sensor. HoloLens, through the use of a Holographic Processing Unit (HPU), can use sensual and natural interface commands—gaze, gesture, and voice—sometimes referred to as "GGV", inputs. Gaze commands, such as head-tracking, allows the user to bring application focus to whatever the user perceives. HoloLens features IEEE 802.11ac, Wi-Fi, and Bluetooth wireless connectivity. Moreover, a Microsoft HoloLens App for Windows 10 PC's and Windows 10 Mobile devices can allow developers to run apps, use a phone or PC keyboard to type text, view a live stream from the HoloLens user's point of view, and remotely capture mixed reality photos and videos.

The command and control computing device 104 can be a tablet computer. In an embodiment, the table computer can be a Microsoft Surface® tablet. An instructor can use the command and control computing device 104 to remotely control the training experience, including on the smartglass in use by a trainee.

The first communication link 108 can be a wireless link, for example via Bluetooth connectivity, and can transmit to the XR device 102 control messages and variables, such as strings, int image files, bool macros and the like. First communication link 108 can also transmit from the XR device 102 to the command and control computing device 104 mixed reality client (MRC) data including JavaScript Object Notation (JSON) data and MRC status variables, such as strings, int image files, bool macros and the like.

The data capture computing system 110 can be a computer, including a desktop or laptop computer using any suitable operating system capable of running the system and method described herein. In an embodiment data capture computing system 110 can be a laptop computer running Windows® software, including Windows 10®. The second communication link 112 can transmit MRC data and control messages to the XR device 102 and can receive variables, such as strings, int image files, bool macros and the like.

Network 114 can be any of known networks, cloud computing, Internet, Intranet, or other communication networks as is known in the art.

Embodiments described herein can utilize an augmented reality (AR) with a physical object. The physical object can be a mannequin 116 which can be in the field of vision 118 of the smartglass 102. In an embodiment, the mannequin can be a trauma mannequin used in conjunction with the system disclosed herein to better simulate a real world training environment. The mannequin can be a substantially complete model of a human being. The mannequin can also be a "part task" object, such as only the chest and abdomen of a human, or only a limb of a human. The physical object can also be in the shape of an animal, and the mannequin can be an animal mannequin useful, for example, in veterinary training.

The physical object, e.g., mannequin 116, can comprise a processor and a wireless transceiver, and comprise moveable internal components. The processor can have memory in which is stored one or more states and one or more properties of the physical object. The moveable internal components can be responsive to programmed and real-time commands and can be responsive to wireless communications from either the command and control device 104 or the XR device 102. In an embodiment, the mannequin can be a smart mannequin. In an embodiment, the mannequin 116 can have a flexible outer skin, for example, flexible vinyl or silicone, and the moveable internal components are configured to simulate skin movement on a human, such as would be observed as breathing, vein extension, pulse, swallowing, limb movement, and the like.

In an embodiment, the mannequin 116 can be a TOMManikin® from Innovative Tactical Training Solutions, Inc. TOMManikin is a trauma mannequin simulator designed for both classroom settings and field training scenarios. Multiple appendages can present a variety of wounds including gun shot wounds, blast wounds, and burns to provide full mission profiles in combat scenarios.

Embodiments of the system and method can provide or utilize intelligent tutoring instructional expertise, clinical expertise (e.g., emergency medicine) and rigorous evaluation capabilities, including face valid scenario design and novel macrocognition performance measures.

Although the power of AR for creating effective simulation-based training is intuitively appealing, it can be important to assess the impact of the training to determine whether the desired effects are achieved. Assessing training can be complex, particularly for learning objectives focused on macrocognitive skills such as problem detection, recognition, assessment, and sensemaking. Embodiments described herein can address these key technical and instructional challenges.

Example embodiments of the system and method can map AR images onto physical mannequins. Example embodiments described herein can integrate AR with mannequins, including "smart" mannequins having the capability of being communicatively connected to computer devices, to provide a scenario-based, interactive learning experience. Embodiments of the system and method can include the development of scenarios, e.g., medical conditions presented with visual and physical cues, that can facilitate the acquisition and objective assessment of critical macrocognitive skills including, for example, sensemaking to accurately diagnose patients, problem detection, recognition of subtle cues, and treatment planning in dynamic settings. Embodiments of the system and method can leverage strategies from instructional systems design (ISD) and naturalistic decision making (NDM) literatures to provide a rigorous evaluation study.

An augmented reality (AR)/mixed reality (MR) computer system can execute software for integrating ISD and macrocognitive measures as described in more detail below. The AR computer system can run on any suitable computing system, such as a dedicated server, a user computer or server, multiple computers, a collection of networked computers, a cloud-based computer system, a web-based computer system, or from a storage device, for example. One or multiple processing units, such as central processing units and/or graphics processing units, may perform instructions stored in memory to execute the processes described herein.

An AR/MR computer system in accordance with the present disclosure can be accessed via any suitable technique, such as a web-browser such as SAFARI, OPERA, GOOGLE CHROME, INTERNET EXPLORER, or the like executing on a client device. In some embodiments, the systems and methods described herein can be a web-based application or a stand-alone executable. Additionally, in some embodiments, the systems and methods described herein can integrate with various types of learning systems directed to specific conditions, such as tension pneumothorax and airway obstruction, and the like. Any suitable client device can be used to access, or execute, the AR/MR computing system, such as laptop computers, desktop computers, smart phones, tablet computers, gaming system, and the like.

Systems and methods described herein may generally provide a realistic augmented reality environment for users (e.g., simulation of a variety of medical conditions) to educate and train caregivers. Interaction with the AR/MR computer system may include, without limitation, keyboard entry, writing from pen, stylus, finger, or the like, with a computer mouse, or other forms of input (voice recognition, etc.). The augmented view may be presented on a mannequin, partial mannequin, tablet, desktop, phone, board, paper, open space, or the like. In one embodiment, the user may interact with an augmented view of a mannequin by operating a tablet displaying the augmented view. In this embodiment, the user may receive real-time feedback, or at least near real-time feedback, based upon their interaction with the mannequin. The AR/MR computer system can be a personal computer, one or multiple computers in server-type system. User interaction with the AR/MR computer system may take place in any of a variety of operational environments, such as a work setting or a home setting, and with one or more users interacting with the system at a given time.

There is a tendency to focus training on skills that are easily measured. Medics, however, often find themselves in situations that cannot be reduced to a single, clear, right answer. Important 'critical thinking' skills include knowing what to pay attention to, rapidly recognizing critical conditions, and using sensemaking strategies to develop and test hypotheses when faced with uncertainty. Although the NDM literature offers recommendations for using scenario-based training to train and evaluate these macrocognitive skills, few real-world examples exist. Advances in AR technology provide an opportunity to build and test these envisioned training applications.

NDM theories describe how people really make decisions in time-pressured, complex situations, and how they use mental frames to drive information-seeking activities and make sense of complex situations. Embodiments described herein can incorporate the Recognition Primed Decision (RPD) model and the data frame model of sensemaking, for example. The RPD model can provide important insight into skilled performance and the educational elements that facilitate skill acquisition. Embodiments described herein can leverage findings from the NDM and cognitive expertise literatures to deliver a training approach that encourages learners to engage in self-directed learning by actively processing information, developing their own interpretations, explanations, and hypotheses, and articulating their own thinking. Example components of recognition skills training can include:

First-Hand Experience.

Learners can benefit from being actively involved in experiencing (i.e., seeing, hearing) and interpreting cues in the environment. Learning can be further enhanced if cues are embedded in realistic scenarios. To encourage active engagement, learners can be asked a series of questions at key decision points in each scenario. These questions/commands can help the learner and can include, for example: "Notice important cues (symptoms), and avoid being distracted by dramatic, but irrelevant cues", "Generate a preliminary hypothesis (working diagnosis) based on the information available", "Articulate what information is needed to confirm or disconfirm the hypothesis (confirmed diagnosis)", "Envision an appropriate course of action (treatment plan)", and "Evaluate the situation in terms of risk for each decision point".

Expert Model.

Research suggests that exposure to an expert model can accelerate skill acquisition. After completing each scenario, learners can be presented with their own responses juxtaposed with expert responses to questions for each decision point.

Reflection.

Expertise literature suggests that a key difference between people who become experts and those who do not is reflection. Experts are believed to reflect back on their experiences and speculate how the situation may have gone differently. They extract lessons learned that they carry forward to future experiences. By asking questions at each decision point and then providing an expert model, learners may develop a habit of reflecting on each challenging situation they encounter, whether it occurs in a training setting or in the real-world.

Feedback.

Feedback can be critical to skill acquisition, yet it is difficult for a teacher to provide real-time feedback to individual learners because of time constraints. Innovations such as embodiments of the trainer described herein can provide feedback to learners immediately following each problem scenario. Because feedback is based on the expert model, key aspects of training can be standardized across training settings and instructors. In addition, the proposed training can allow for compressed time scales, so the learner can view the outcome of a particular intervention (or a delayed or absent intervention) that would normally occur hours or days into the future.

Scaffolding.

Moving learners progressively toward stronger understanding and, ultimately, greater independence in the learning process can be a key tenet of an NDM-based instructional approach. To scaffold appropriately, novices can receive on-the-spot feedback and hints when they fail to recognize critical cues. More experienced learners may be allowed to fail and then can be exposed to expert choices and rationale at the completion of the scenario to encourage reflection.

Motivation.

Motivation can be a key component of skill acquisition. It is often not enough for learners to go through the motions, they must often be motivated to learn and apply the learning. This can be referred to as "deliberate practice". The proposed training may motivate learners to deliberately practice in anticipation of applying skills in real-world emergencies. In addition, Embodiments of the system and method can use strategies for engagement used in the computer gaming industry, (i.e., use of a dashboard that displays own performance in comparison to peers).

AR and Smart Mannequins.

Augmented reality (AR) has been used successfully in the marketing and entertainment industries to bring products and simulated experiences to life. AR technology is a powerful way to provide the experience of first-hand exposure to realistic perceptual cues (e.g., visual, haptic, and auditory stimuli) in situations that might ordinarily be very difficult to replicate. This makes AR an increasingly viable tool to deliver occupational training in complex environments. While virtual reality (VR) immerses a person in a virtual environment, AR allows the users to see the real world with virtual objects superimposed. The relatively low cost and extreme flexibility of AR applications makes them practical and portable.

AR may offer important advantages over existing training technologies. Mannequin systems have long been a part of Combat Life Saver training and their technology continues to evolve to support increasingly sophisticated medical training. Mannequins alone may provide excellent opportunities to build psychomotor skills required to administer critical interventions. But these systems are not infinitely scalable. They are specifically designed to present a relatively narrow range of diagnostic cues and to allow for a modest number of therapeutic interventions. Because they are fixed hardware tools, mannequin systems alone may lack the ability to represent certain perceptual cues that can be vital to appropriate diagnosis and treatment of some conditions.

For example, using physical mannequins alone, a trainee may not be presented with perceptual cues critically important to intervention, including such cues as: healthy versus atypical breath sounds; healthy versus asymmetrical rise and fall of the chest; healthy versus jugular vein distention; healthy versus atypical skin tone; healthy versus swollen airway; properly placed versus kinked needle decompression; and, properly placed versus leaky occlusive dressing. These and other perceptual cues can be modeled and used for training with the system, method and apparatus disclosed herein.

AR-based training systems represent an important opportunity to overcome these challenges. The robust visualization capability of AR allows for the representation of cues, including what can be predetermined as critical cues, that is not available in either mannequin systems or live-tissue models. AR also makes it possible to more easily present cues that represent injury escalation over time. Finally, software updates can be rapidly developed to incorporate new conditions, new corresponding cues and new scenarios to train associated skills. AR solutions may eventually be a cheaper, more scalable and more robust form of training than current training approaches.

Embodiments described herein can be used, for example, with any suitable trauma mannequin simulator designed for classroom or field settings. Such mannequins may be capable of presenting a variety of wounds including gunshot wounds and blast and burn injuries to provide full mission profiles in combat scenarios.

AR may be particularly effective as a training tool in situations where creating and leveraging a real-world training environment is too difficult, too dangerous, or too expensive. To successfully deliver an AR training tool that integrates recognition and assessment tasks with interventions, realistic AR cues can be mapped onto physical mannequin so that the learner is able to directly perceive subtle changes in the patient condition (e.g., asymmetric rise and fall of chest cavity), take appropriate action (e.g., needle decompression), and then reassess. To provide this sort of interactive learning experience, embodiments of the system and method can incorporate target tracking, sensory input and control, and the display capabilities of advanced graphics processing units (GPUs). The following sections describe technologies that can be used in accordance with embodiments of the system and method described herein.

AR Target Tracking.

For AR target tracking, systems can utilize computer vision frameworks. Such frameworks can support a number of visual tracking methodologies, including 2D fiducial marker tracking, 2D image tracking, human face and skeleton tracking, 3D object tracking, and environmental motion tracking, for example. Operational challenges facing visual tracking may include operating in poor lighting conditions, dealing with fast-moving targets, organic/deformable objects, and view occlusion, where something blocks part of the view of an AR target for a period of time. Approaches and combinations can be used to overcome these challenges. For instance, 3D object tracking combined with environmental motion tracking may be used to minimize problems of view occlusion. Using dynamic occlusion reasoning with sensed 3D geometry may solve problems with occlusion seen in current tracking approaches. It is contemplated that mobile wearable products powerful enough to run these programs for extended periods of time may be advantageous. To address problems with lighting, the addition of IR emitters/sensors can help to mitigate the limitations of using AR in a darker environment. As for fast-moving objects, advances with CPU and graphic processing unit (GPU) speeds, combined with improvements in photosensor and other visual sensor capabilities, may improve tracking performance.

Sensory Input and Control.

User input on mobile AR platforms can leverage existing touchscreen and voice control approaches. Simple to intermediate voice control schemes are being employed on consumer smartphones, tablets, desktop systems, as well as Internet-of-Things connected appliances and platforms such as Amazon Echo. Speech commands are being used for hands-free control of many systems' base functionality, as well as simple speech to text and text to speech capabilities. Embodiments utilizing machine-learning can provide robust language analysis and better context recognition of free-form speech input. Deep learning systems are contemplated, but may require more processing power than current tablets and smartphones can deliver, relying on cloud-based systems, or specialized high-performance computers. Embodiments of the system and method can be associated with emerging wearable AR platforms, such as the Microsoft HoloLens, where gesture control can be provided through a hand-tracking system that makes use of a depth camera and an onboard computer vision system. Additionally, Embodiments of the system and method can support tracking the user's position and orientation in 3D space, with six degrees of freedom. Haptic feedback for mobile AR are contemplated and can take the form of a wireless or wired peripheral.

GPU and Display Capabilities.

Embodiments of the system and method can incorporate camera-enabled mobile devices, such as smartphones and tablets, to provide a viable platform for AR experiences. The GPUs found on current high-end devices, when used with an optimized 3D graphics engine, can provide a high level of visual fidelity and detail. The high resolution and ultra-bright organic light-emitting diode (OLED) screens used in high-end mobile devices can allow the screen to be visible in a wide range of viewing conditions, from bright to dark. OLED is generally light, flexible and allows for transparent and see-through displays, making it a viable medium for AR display systems and AR wearables. Embodiments of the system and method can include sensing systems using infrared (IR) that are incorporated into next generation smartphones to provide 3D depth mapping in support of motion tracking and area learning. Embodiments of the system and method can include AR eyewear devices. Embodiments of the system and method can include AR display systems that can provide nearly photorealistic real-time 3D graphics using mobile game engines like Unity and Unreal. On high-end mobile devices, these engines can support high polygon counts, with multiple levels of detail, real-time global illumination, physically-based shading, as well as material properties such as specular, reflection, bump mapping and normal mapping. Specialized shaders can be developed to create visual effects that mimic the look of metals, glass, vapors and liquids. Physics systems can be employed to simulate realistic phenomena, such as fluid, smoke and fire. Utilizing a 3D game engine may have additional benefits, including the ability to deliver 3D spatial audio. Sound can be used to add depth, realism, and emotion to an AR experience, where users can listen to virtual characters speak and hear virtual props make sounds as they use them.

Evaluation Strategies.

Numerous sources are available that can provide valuable guidance regarding what constitutes meaningful evaluation of training interventions. When applying this evaluation framework, the focus can include survey responses regarding attitudes, test scores assessing knowledge, and directly observable performance measures. These ISD-based components can establish a critical baseline for evaluation. Embodiments of the system and method can be used to augment traditional ISD evaluation strategies with macrocognitive metrics and measures, which can place a strong emphasis on expertise development. Table 1 below adapts 6 levels of scenario description identified for evaluating the impact of decision support technology for use in designing face valid scenarios to objectively assess the impact of the training.

TABLE 1

Levels of scenario description for evaluation

| Levels of Scenario Description | Indicators of Sufficient Integrity |
|---|---|
| Surface validity | Professionals representing the target user population are engaged in the scenario activities and consider them face valid. |
| | Participants are willing to perform tasked activities during the evaluation. |
| | Participants can easily explain why scenario elements are appropriate for their work setting. |
| | Participants recommend participation in the training to colleagues. |
| Representative complexity | The scenarios reflect the range of complicating situations that experts are likely to face on the job. |
| Model of support | The scenario reflects complex situations where the training is expected to improve performance. |
| | The scenario reflects a range of complexity to explore the boundaries of typicality versus anomaly - where common heuristics are likely to break down. |
| | The scenario supports a qualitative, holistic assessment by participants and evaluation team members about whether the training addresses skills that would be useful in their real-world setting. |
| Scenario difficulty | There is a range of performance across study conditions, making it possible to evaluate the contribution of the training to skill acquisition. |
| Performance observability | The scenarios enable objective observers to reliably determine the quality of cognitive and collaborative performance via externally observable indicators (e.g., participant utterances or observable actions) |
| Value/impact potential | The scenarios reflect complex situations where improvements in performance would be anticipated to reap significant benefits to the organization (e.g., more affordable, more portable training) as well as the end user (e.g., more confident, more prepared) |

Macrocognitive metrics tend to be tailored to a specific situation or scenario. For example, Embodiments of the system and method can use a rigor metric that focuses on elements such as appropriate hypothesis exploration, information search, information synthesis, and others in the context of a specific scenario. Behavioral indicators related to each element are identified for individual scenarios. Embodiments of the system and method can integrate macrocognitive measures with established ISD measures to design a robust evaluation strategy.

Figure 2:
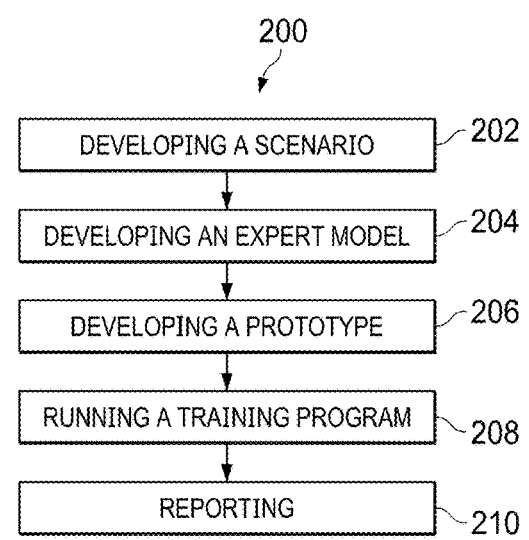
FIG. 2 depicts a flow chart for creating and running a training scenario according to one embodiment.

Referring to FIG. 2, it will be appreciated that the design, development, and execution of a training program can include any suitable methodology, such as Method 200. For example, Developing a Scenario 202 can incorporate cognitive task analysis (CTA) interview techniques to elicit a case base of real-life incidents involving, for example, tension pneumothorax and airway obstruction. Interviews can be conducted with experienced emergency medical services (EMS) and emergency department (ED) personnel, including experienced pararescue jumpers (PJ), ED physicians, and others identified that may be relevant or useful. The incidents gathered in these interviews can serve as the foundation for both training and evaluation scenarios and can provide context and details that can be used to meet the criteria described in Table 1.

CTA focuses on understanding the cognitive aspects of a particular job. Developed specifically to aid interviewees in articulating tacit aspects of expertise, modern CTA methods emerged in the 1980s, and have been refined extensively over the last 30 years. CTA methods can include in-depth, incident-based interviews, and observations of expert performance in naturalistic or simulated settings. CTA can be been applied across a range of military and commercial domains in the context of both basic and applied research. Embodiments described herein can apply a specific CTA method called the critical decision method (CDM), for example. The CDM is perhaps the most well-established CTA method. First articulated in 1989, the method is based on Flanagan's Critical Incident technique. Interviewees can be asked to recall an incident in which their skills were challenged. After obtaining a brief overview of the incident, the interviewer and interviewee can work together to build a rough timeline of the major events. From the timeline, the interviewer can then probe critical points in the incident to explore elements such as goals that were considered during the incident; options that were generated, evaluated, and eventually chosen; cue utilization; contextual elements; and situation assessment factors specific to particular decisions. In the final portion of the CDM interview, hypothetical questions can be used to explore errors inexperienced personnel might have made in similar situations, and to explore the implications of specific cues or events.

The system and method of the disclosure can utilize scenarios, which can be medical conditions presented by the system and method for training. Scenarios can have one or more stages of the medical conditions. For each stage the system and method can present to a student trainee various time-based symptoms and other perceptible cues, which can be critical cues for a trainee to observe and react to. Example scenarios and representative stages of time-based conditions with visual cues to be presented to a student trainee for are as follows:

Example Scenario 1: Tension Pneumothorax

An explosive ordnance disposal (EOD) soldier was attempting to neutralize a small improvised explosive device (IED). The IED detonated during the deactivation attempt, causing a blast lung injury, temporary loss of consciousness, blunt force trauma to the rib cage, and burns to the patient's hands. The patient was thrown approximately two meters away from the blast site, and landed on pavement. This is an active combat situation, so a key concern is security. Patient is a male, 20-23 years old, approximately 180 lbs.

Time 1: 30-60 seconds after point of injury (POI): At this point, the learner is able to do a quick assessment of the patient, but needs to stay alert to changing combat conditions. The patient does not show signs of massive hemorrhage, but there is some blood in his mouth. The patient has close to full respirations, but his inhalation volume is decreased. He has a fast rate of breathing and is showing some signs of breathing difficulty. The patient is alert, but is in pain and has superficial and partial thickness burns to his hands. Assessment is interrupted by active fire.

Time 2: 15 minutes after POI: The area is now secure, so the learner is able to continue assessing the patient. The learner is able to determine that there are broken teeth in the patient's mouth, and it looks like the patient bit his cheek and tongue (explaining the blood in the mouth seen at Time 1). The patient has bruises on his right rib cage, and there is a slight paradoxical motion in the rise and fall of his chest. The patient is having more difficulty and increased effort of breathing. The patient is alert and talking in short sentences. The patient is now able to be moved to a more secure area.

Time 3: 45-60 minutes after POI: The patient is now in a secure and protected area, and the learner is able to re-assess. Since the last assessment, the patient is breathing more rapidly and is now wheezing. He is becoming hypoxic and cyanotic. The paradoxical motion in his chest is more pronounced, and now there is an obvious flail chest segment. The bruises to his torso are larger and have changed color. The learner is able to see unilateral rise and fall of his chest. The patient is confused and his skin is pale.

Time 4: 3 hours after POI: The patient has not yet reached a definitive care facility, but he is sheltered in a secure location. Upon reassessment, the learner notices that the patient is coughing excessively with productive red sputum. The patient has decreased breath sounds and there is blood coming out of his mouth. The patient is showing unilateral rise and fall of the chest, and his torso bruising has worsened. The patient shows jugular vein distention and tracheal deviation. His skin is pale and he is in and out of consciousness.

Scenario 2: Airway Obstruction

A rocket-propelled grenade (RPG) strikes the driver side front door of an up-armored vehicle in a convoy. The driver (wearing a ballistic helmet, body armor, and gloves) was closest to the explosion and remained entrapped in the vehicle for approximately 90 seconds before his teammates are able to pull him from the burning wreckage. He receives partial and full thickness burns around his neck, jaw, and upper cheeks. The body armor protected his chest from any direct burns or penetrating injury. The soldier's upper extremities were hit with shrapnel and debris. His gloves protected his hands, but there are ring burns around his wrist.

Time 1: Immediately following POI: The learner is able to get to the patient shortly after he was removed from the burning vehicle. After getting the patient to a secure location, the learner assesses the patient. While there is blood on his uniform, it is from lacerations from debris; there is no massive hemorrhage. The patient has singed nostril hairs and the skin on his face and his lips is turning red, like he has been sunburned. There are also small pieces of shrapnel in his face. There are no major secretions in his mouth and his neck looks normal. His voice is hoarse and he is coughing. The patient has increased respirations, but his chest movement is normal. Patient is conscious but in pain and seems to be rambling. He is sweating and has light burns on his arms.

Time 2: 5-10 minutes after POI: The patient has become lethargic and is in obvious respiratory distress, so you reassess. You notice that the tissue along his airway is beginning to swell, and the patient is coughing up thick carbonaceous sputum with some yellow-green phlegm and blood. The skin around the patient's mouth is becoming a darker red, and blisters are forming across his cheeks and forehead. The patient's nostrils are becoming smaller, and there is general swelling around his face. There are more secretions in his mouth, and his pharynx is starting to close up.

Time 3: 15 minutes after POI: Non-surgical attempts at managing the patient's airway have failed, and the patient's condition is worsening. The tissue in his nose and mouth is significantly swollen; his lips are triple in size. Larger blisters are starting to form on his face. The carbonaceous sputum and secretions in the mouth are very prominent. The learner hears stridor, wheezing, and wet lung sounds. The patient has an increased effort and rate of breathing. The patient is fatigued and has a muted cough.

Each of these example scenarios describe the trajectory of the patients' injuries if appropriate medical interventions are not applied. The system, method, and apparatus of the present disclosure can model virtual patients that reflect these scenarios.

Method 200 can include Developing an Expert Model 204. After scenarios have been drafted, subject matter experts (SMEs) can review each scenario and provide feedback regarding refinements to increase realism and training efficacy, and to identify important variations to include in future scenarios. When two training scenarios and two evaluation scenarios have been finalized, each SME can be asked to work through the scenarios and respond to question probes at each decision point. The research team can review SME responses and develop an expert model that will drive feedback for the learner at each decision point. When experts do not agree, agreement can be reached by consensus or feedback could include a minority view.

Method 200 can include Developing a Prototype 206. Any suitable platform, such as Unity® 3D from Unity Technologies, can be used as the development platform for the client AR application. Embodiments of the system and method can include using a platform that can support a wide range of existing and emerging devices, including AR platforms such as Google's Project Tango and Microsoft's HoloLens. Applications, such as Unity 3D apps, can be developed once and then deployed across a variety of devices with relatively little additional work. Embodiments of the training technology can be available on a wearable platform such as the above-mentioned HoloLens and/or Android-based tablets enabled with Google Tango 3D depth sensing technologies to support relatively inexpensive and rapid iteration, participatory design, and testing. Example features or elements associated with Developing a Prototype 206 can include the following:

Virtual Props.

Virtual props can be used in developed training scenarios. Virtual props can be images of peripheral equipment used to depict real-world objects and equipment that would be present in a simulation environment. Examples used in medical simulations include medical interventions such as decompression needles, chest seals, endotracheal tubes, intravenous (IV) bags, as well as devices such electrocardiograms (EKG), pulse/ox monitors, mobile field sonograms, and the like. All virtual assets can be designed to scale across low-powered mobile devices all the way up to high-powered GPU-based gaming systems and simulation systems.

Virtual Humans.

Virtual humans can be incorporated into the system and method disclosed herein. Virtual patients can be built from high-resolution full body photogrammetry scans of real humans or in any other suitable manner. Embodiments of the system and method can utilize technology used in state of the art movie visual effects to achieve the highest quality results. 3D artists can takes this scan data and create refined virtual patient assets that can be used in embodiments of the simulation system. On higher-powered systems, virtual humans can utilize dynamic skeletal and facial animation, for more realistic and engaging performances. 3D spatial audio can be supported in the AR training platform, which can support a virtual human's sounds and voice such that they are depicted accurately. Custom shaders can be used to simulate the appearance of human skin and sub-surface light scattering effects through thin tissue.

Virtual Patient Registration to Physical Mannequin.

As depicted in FIGS. 4-8, embodiments of the system can use mannequin 116 with a virtual image registered thereon for viewing through the smartglass 102. Virtual image registration can utilize markerless tracking and a user initiated 2-point registration process to the lock the virtual patient overlay to a physical mannequin 116.

Figure 3:
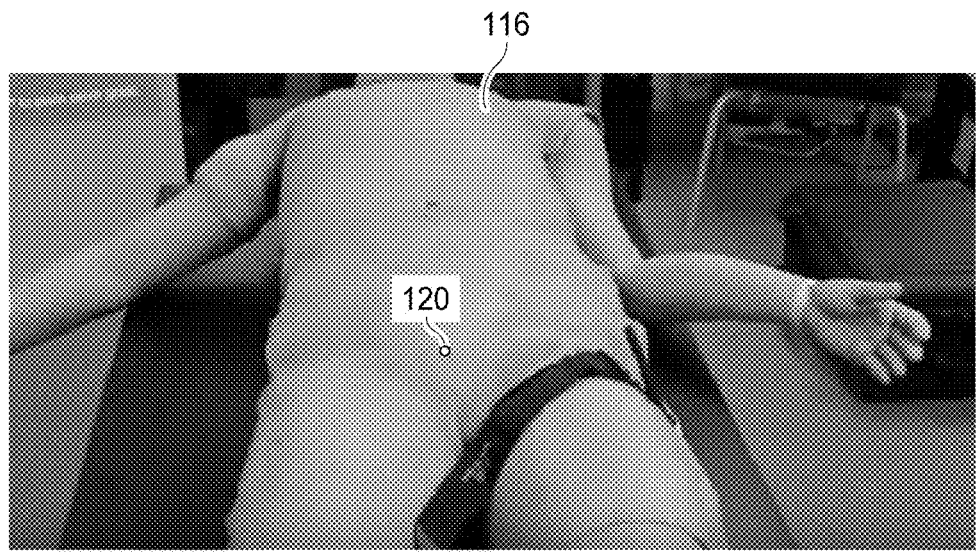
FIG. 3 depicts a screenshot of from the view of a user setting a registration point.

As shown in FIG. 3 which is a view from a HoloLens looking at a physical TOMManikin mannequin 116, an indicator cursor 120 appears in the viewport of the HoloLens and can be positioned on the mannequin. Cursor 120 is viewed through the HoloLens and moves with the viewer's head movement. The cursor can appear after a prompt from the system to register the mannequin, and a voice command, such as "register patient." In an embodiment an indicator can instruct the user to place the cursor on a predetermined position on the mannequin, such as the mannequin's pelvis. In such an embodiment, a user can then set the marker, such as by a voice command, for example, "set pelvis."

Figure 4:
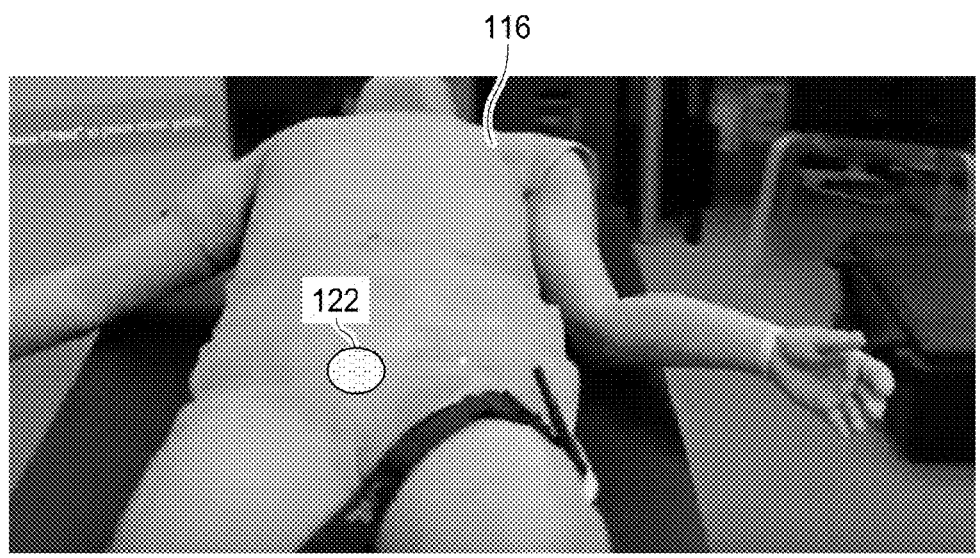
FIG. 4 depicts a screenshot of from the view of a user after setting a registration point.
Figure 5:
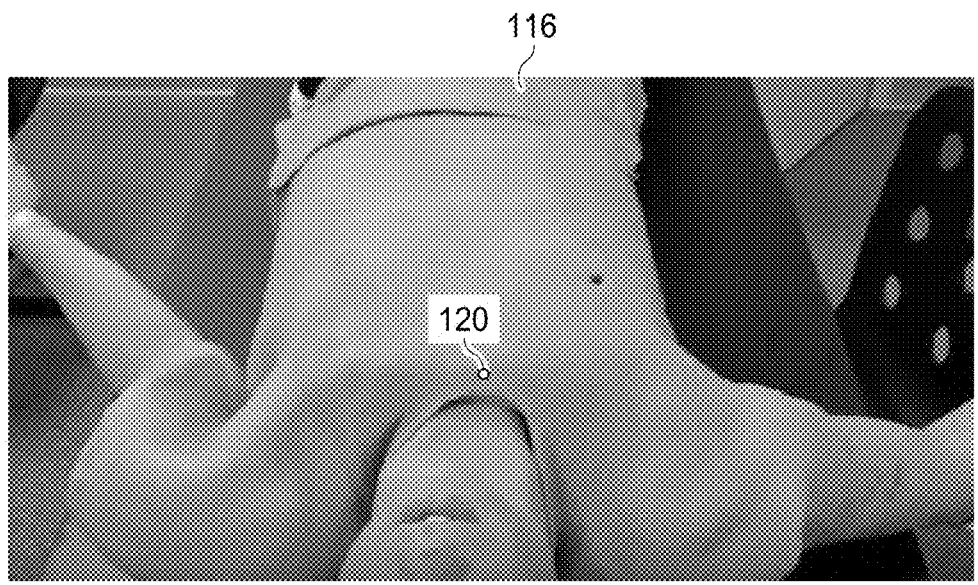
FIG. 5 depicts a screenshot of from the view of a user setting a registration point.

As shown in FIG. 4, after the "set pelvis" command a virtual guide 122 can appear in the HoloLens view on the mannequin's pelvis to indicate that the first registration point is set. At this time, the user can view a message instructing her to place the cursor on a second location of the mannequin, such as the mannequin's chest, and say "set chest." As shown in FIG. 5, as before, an indicator cursor 120 appears in the viewport of the HoloLens and can be positioned on the mannequin's chest. Again, the user can use a voice command, such as "register patient," and the second registration point can be set.

Figure 6:
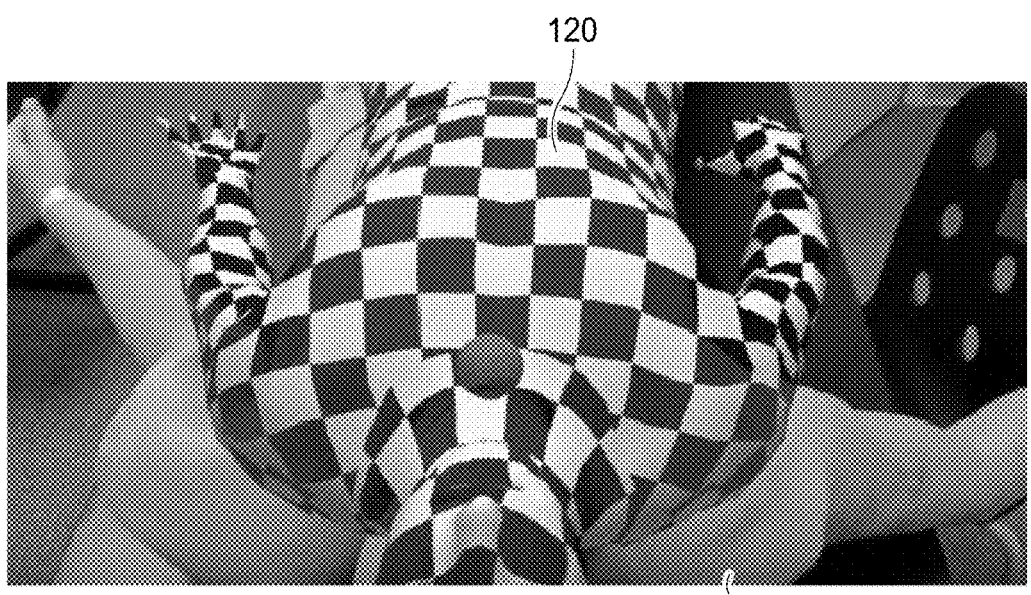
FIG. 6 depicts a screenshot of from the view of a user after setting a second registration point.
Figure 7:
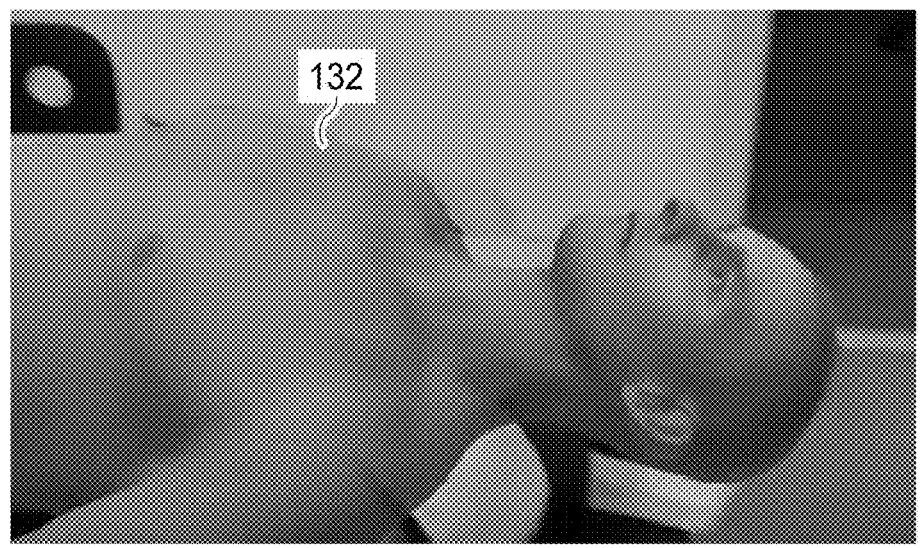
FIG. 7 depicts a screenshot of from the view of a user after registration of a virtual patient image is complete according to one embodiment.

Once the two points are set for registration, a virtual grid 124 showing the placement of the AR virtual patient image can appear overlaid on mannequin 116, as shown in FIG. 6. The user can continue to move the pelvis and chest points to more accurately properly place the AR virtual grid, and can then give a voice command such as "finish registration." Once registration is complete the user views a virtual patient image 132 overlaid on the mannequin, as depicted in FIG. 7.

As discussed in more detail below, after registration, the user, either a trainer or a trainee, can call up a medical scenario by stage. For example, a user can call up a trauma scenario by number and a stage of trauma for that scenario by number. In an embodiment, for example, "Scenario 1" can be a scenario depicting a patient suffering from tension pneumothorax. Once Scenario 1 is called up by a voice command such as "scenario one," the user can then set a stage of the condition, such as "Stage 1," which can be the beginning stages of tension pneumothorax, for example.

Once a scenario is called up, and if available, a stage, the system and method can lead a student through more stages with varying conditions being presented by the virtual image mimicking the changes a body goes through in the various stages, as more fully disclosed below.

Embodiments of the system and method can utilize a mix of marker/markerless tracking approaches to align the virtual patient's extremities to that of the physical mannequin. In an embodiment, one or more fiducial markers can be utilized to anchor the virtual image onto the mannequin. Conventionally, a fiducial marker is an object that is used in the field of view of an imaging system and which appears in the resulting image. In other words, conventional markers can be used as markers in images and not as markers on real-world objects. Because the disclosed AR system and method relies on real-time registration and rendering of synthetic imagery onto the mannequin, the system can employ fiducial markers, or image patterns with a known size and configuration to track the position and orientation (pose) of the mannequin, or to determine the user's position with respect to mannequin. The fiducial serves two purposes; the first is determination of the position of the user's vantage point with respect to the fiducial, and second is relating the position of the user to a map or model of the environment or item to be augmented.

Augmented reality fiducials can take two forms. According to one technique, a target is constructed to allow reliable detection, identification and localization of a set non-collinear points where the arrangement and location of the points is known a priori. This is called a synthetic fiducial. The second approach is to use a set readily identifiable naturally occurring non-collinear patterns (or image features, for instance, a small image patch or a tattoo image) in an image that can be reliably detected, identified, localized, and tracked between successive changes in a camera pose. These are called natural fiducials.

In an embodiment, the appearance of fiducial markers in images serves as a reference for image scaling. For instance, fiducial markers at known locations in an image can be used to determine the relative scale of the image. Fiducial markers can also be used to make features of an image more visible. Fiducial markers can be embodied as tags that are placed in space or in the mannequin to assist in object recognition, object tracking, and/or object modeling. Embodiments of the fiducial markers disclosed herein, by way of example and not limitation, support active interrogation, are recognizable at comparatively longer distances, are less obvious to ordinary inspection, and/or are able to store significantly more data or enable access to significantly more data.

In an embodiment, the mannequin 116 is marked with two markers that can be any image having suitable computer-identifiable characteristics, as is known in the art. In an embodiment, the markers can be images of tattoos, for example. By locking in to first one fiducial marker and then the other and getting the registration set off of these marks, offsets and other criteria associated with registration can be set. If the mannequin is moved, the system can quickly relock in on those same two markers, resulting in the system keeping the same configuration of virtual image overlaid on mannequin 116.

Using fiducial markers improves the speed of the registration process described above that relies on anchoring to a spatial map. Using fiducial markers also solves the problem of movement of the mannequin. When anchoring on a spatial map, if the spatial map changes, i.e. if you move the mannequin, the anchor points are regenerated, essentially, and they're no longer relevant to where the new mannequin's position is.

It is possible to combine multiple approaches to improve the registration and tracking of a virtual object mapped to a physical object. For example, by leveraging 2D fiducial markers with simultaneous location and modeling (SLAM) techniques, a fixed location in space can be determined. The location provided by the fiducial markers can then be digitally anchored to an existing spatial map created using other techniques. This is particularly useful in situations where a physical object may be moved from one location to another. By leveraging the power of fiducial markers, a virtual object can quickly be relocated to another position in 3D space simply by reacquiring the fiducial markers—shortening the time needed to construct an entirely new spatial map and re-insert the virtual object. In dynamic training environments, such as tactical combat casualty care and prolonged field care, the value of rapid re-registration of a virtual object to a physical object is dramatically increased.

Fiducial markers can be attached, e.g., by adhesive, to the mannequin, such that they are always in a very consistent place. The user no longer has to look at just a blank mannequin and guess where these offsets would be using computer vision software.

In an embodiment Vuforia® Augmented Reality Software Development Kit (SDK) can be utilized for fiducial marker systems. Vuforia uses computer vision technology to recognize and track planar images (Image Targets) and 3D objects in real-time. The Vuforia image registration capability enables users of the system disclosed herein to position and orient virtual objects, such as the patient virtual image, in relation to real world objects, such as the mannequin, when these are viewed through a viewer such as the HoloLens, or the camera of a mobile device. The virtual object then tracks the position and orientation of the image in real-time so that the viewer's perspective on the object corresponds with their perspective on the Image Target, so that it appears that the virtual object is a part of the real world scene. which supports computer vision as well augmented reality content. Using computer vision, we can use these visual reference markers that are adhered to the mannequins to always have a consistent placement of registration points. This removes the variability of these points being a little bit different on the mannequin every time that a user manually registers the virtual patient to it.

In an embodiment, one or more of the fiducial markers can be in the form of a tattoo image on part of mannequin 116. In an embodiment the fiducial markers are produced with the mannequin part such that the fiducial marker is accurately and precisely placed for repeatable imaging if mannequin parts are changed over time. In an embodiment, existing mannequins can be retrofitted with fiducial markers.

In an embodiment, the fiducial markers can be visual elements adhered to the outside of the mannequin. In this manner, fiducial markers lower a barrier of usage and improves usability because the user can simply look at something that they can see in their normal human field of vision, and the computer vision system can see the same thing. It lowers the barrier and time it takes to set registration points and even to understand that there is something that needs to be set. Someone with a low level of knowledge can use the system, with, for example, an instruction for them to look at an eagle tattoo on a mannequin and American flag tattoo on the mannequin. A user can quickly identify and utilize the fiducial marker images to gain image registration.

In an embodiment, the system and method disclosed herein combines spatial mapping with the fiducial marker tracking. The fiducial markers can be used to set registration points. Once the registration points are set, they are transferred into a spatial mapping system. At this point the fiducial makers no longer need to be seen in order to have a virtual patient align to the mannequin through spatial mapping.

In an embodiment, fiducial markers are not used to real time track a virtual patient to the mannequin; rather they are used for initialization and setup of the virtual patient.

In a scenario where fiducial markers are not used on the mannequin and the mannequin is moved, the spatial map needs to be reset. The patient image can still be anchored at the anchor points of the fiducial markers at the old position in the room. In order to re-register or to update the orientation of the virtual patient to the mannequin, the user initialize marker-tracking mode for a moment on the device, look at the fiducial markers that are incorporated on the mannequin and essentially, re-register or relock these coordinates of the updated positions of this fiducial marker relative to this spatial map in a new area of the room. Once the system detects that we have a new pelvis point and a new chest point, for example, in a different area of the room where they weren't before, the spatial mapping anchor points can be updated such that the virtual patient can update its position relative to where those new coordinate anchor points are in the spatial map, and now show the virtual patient correctly with the updated mannequin's position using fiducial markers.

Figure 8:
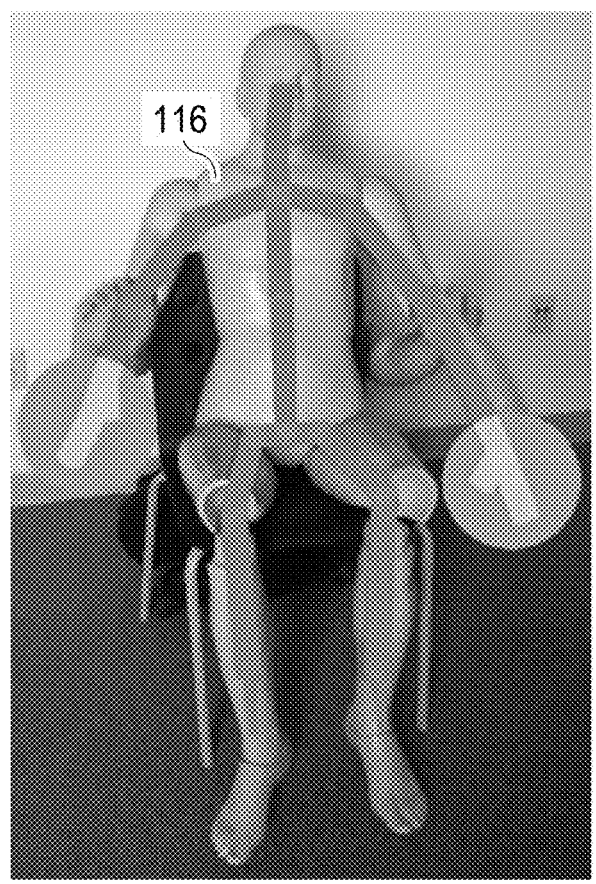
FIG. 8 depicts an example of skeletal tracking according to one embodiment.

Embodiments of the system and method can incorporate intensive computer vision approaches including face and skeleton tracking to allow for real-time dynamic registration of the virtual patient with little to no direct involvement from the user. For example, as shown in FIG. 8, mapping a virtual patient onto a physical mannequin with moveable limbs can be enhanced by utilizing real-time skeletal tracking using 3D depth sensors. FIG. 8 is a still shot of an image in which manual movement of the mannequin 116 limbs can be tracked virtually using Microsoft Kinect®. Skeleton and hand tracking are currently being used in support of Natural User Interfaces (NUIs). Microsoft Kinect® and Orbbec® are examples commercial products that enable skeleton tracking. Skeleton tracking can be used to enhance the humanoid attributes of the mannequin 116 for dynamic patient registration.

Figure 9:
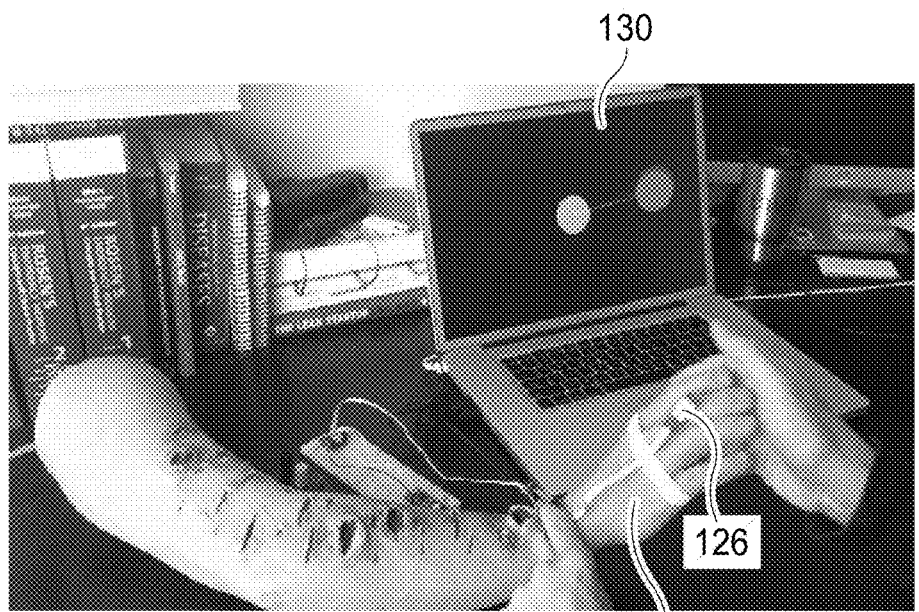
FIG. 9 depicts an inertial measuring unit being used to track limb movement according to one embodiment.

As shown in FIG. 9, inertial measurement units (IMUs) 126 can be utilized to track a mannequin's limb movements. IMU's are electronic devices that measure and report an object's force, angular rate, and in some cases, surrounding magnetic field. IMUs use a combination of gyroscopes, accelerometers, and sometimes magnetometers. IMUs can be placed directly on the object to be tracked. IMUs can be chained and attached to a mannequin to track the mannequin's movements and represent the movement in the virtual environment. As depicted in FIG. 9, for example, an IMU 126 can be attached to the hand 128 of a mannequin, with a corresponding image on a screen 130 to indicate relative movement of the hand 128. The image of FIG. 9 is a still shot of the hand 128 being manipulated and the relative movement with the arm being tracked and represented as spots that move relative to one another. As shown, the left spot (as depicted in FIG. 9) can be relatively stationary while the right spot on the screen (as depicted in FIG. 9) is linked and moves with movement of the hand.

Figure 10:
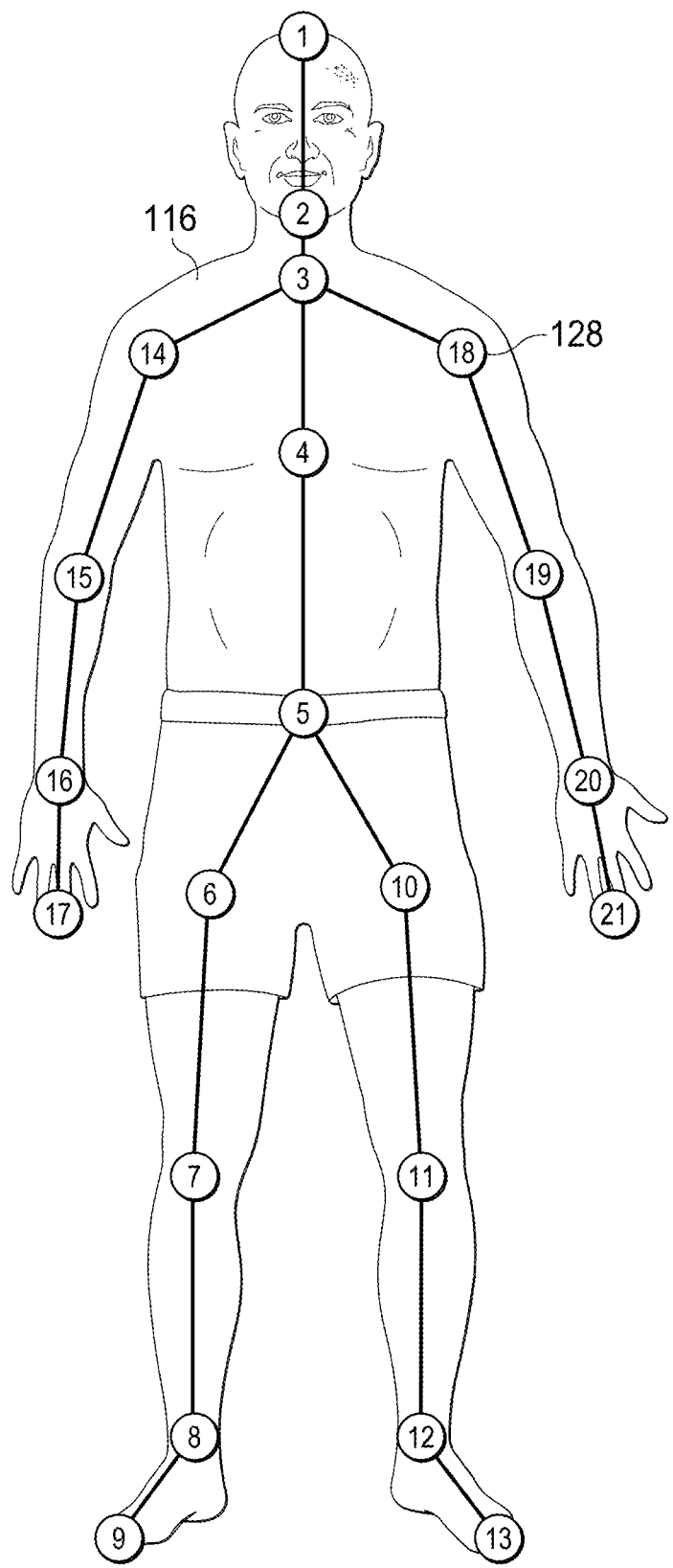
FIG. 10 depicts schematically one method of placing inertial measuring units on a mannequin according to one embodiment.

In general, as shown in FIG. 10, any number of IMU's 128 can be placed on a mannequin 116 and correlated to the system such that movement of limbs of the physical mannequin 116 can result in the virtual image following in real time. In FIG. 10, 21 IMU's 128 (numbered) are shown placed on a mannequin 116.

Figure 11:
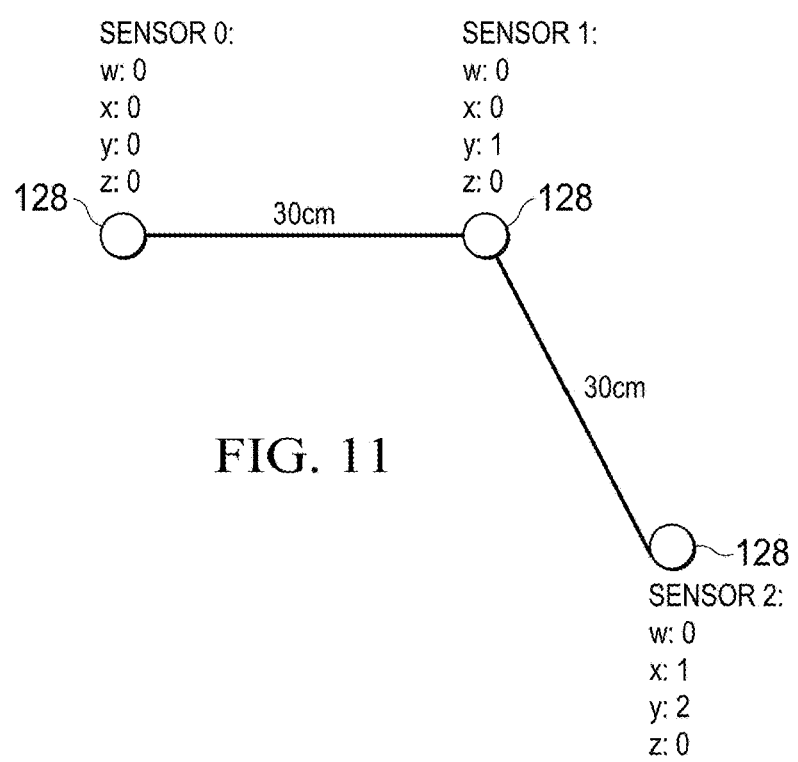
FIG. 11 depicts a schematic illustrating embodiment method of tracking mannequin limb movement by the use of inertial measuring units according to one embodiment.

In practice, the system utilizing IMU's can be illustrated by considering three sensors on a mannequin, the three IMU's being located at positions corresponding to a shoulder, elbow, and wrist, each at a fixed length of 30 cm apart. A schematic depiction of this arrangement is shown in FIG. 11. To register a sensor 128 for mixed reality, a HoloLens user can look at sensor 0 and fix a local point in 3D space. Combined with the local coordinate from the sensors 128, for example as sent to the HoloLens over the network 114, the sensors could then be mapped in a mixed reality view where the virtual object can mirror the movements of the physical object.

Hands Free Operation.

The XR device 102, such as a HoloLens, of the system can support hands-free interactions through the use of speech recognition technology. The user can call out simple two- to three-word command phrases, for example, to control every aspect of the simulation experience. Vision and speech recognition technology can be embedded in middleware associated with the system and method disclosed herein.

Personalized, Automated Training.

Embodiments of the system can incorporate scaffolding techniques such as, for example, providing a virtual grid to aid the learner in visualizing the physical asymmetric rise and fall of the chest of a mannequin, thereby better visualizing a characteristic of tension pneumothorax, for example.

Embodiments of the system can provide personalized feedback tailored to the user. Any suitable data can be collected, such as user gaze during specific points in the scenario, to provide tailored feedback. The system can leverage extensive intelligent tutoring experience. Any suitable tutoring products including ReadInsight, a reading comprehension skills tutoring system that assesses and diagnoses each learner's specific reading skills deficiencies and tailors instruction accordingly, can be used. SimBionic, an award-winning visual authoring tool and runtime engine for creating complex behaviors in training simulations and games quickly and easily can also be utilized.

Referring back to FIG. 3, the method 100 can include Running a Training Program 108. In an embodiment, a training program can utilize the system and method of the invention as illustrated with reference to FIGS. 12-22.

Figure 12:
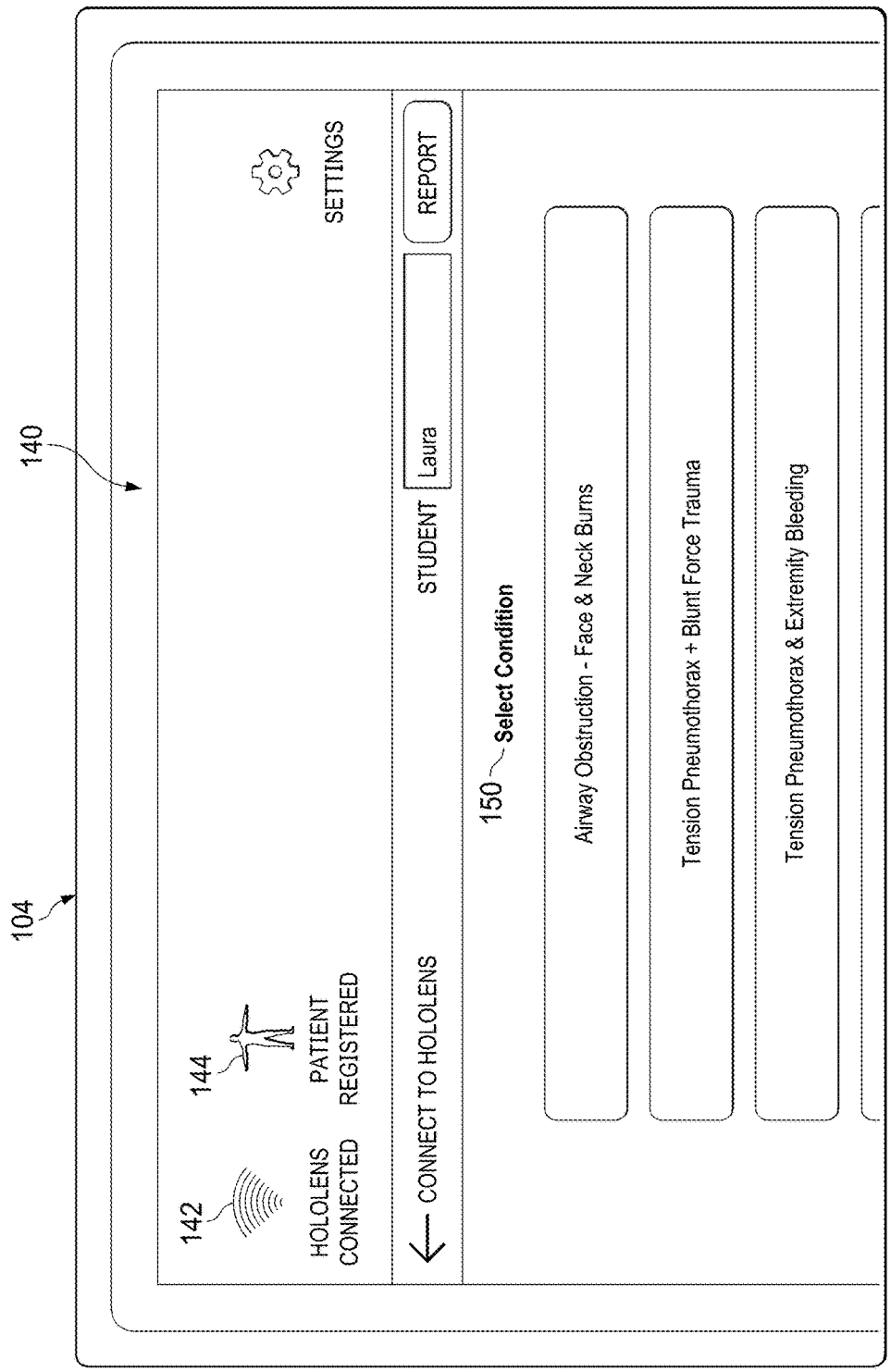
FIG. 12 depicts a screenshot from a command and control communication device according to one embodiment.

As depicted in FIG. 12, after the virtual patient image 132 is registered onto mannequin 116 as described above with reference to FIG. 8, a condition can be specified from the command and control computing device 104, which can present a screen 140 to an instructor, a portion of which depicted in FIG. 12. As depicted in FIG. 12, screen 140 can depict system criteria such as showing that a HoloLens is connected 142, a virtual patient is registered 144, the name (or other identification) of a student 146, and a report button 148. Additionally, an instructor view of the command and control computing device 104 can present a selection of possible scenarios 150 to present via the virtual image 132 and mannequin 116 to the student.

Figure 13:
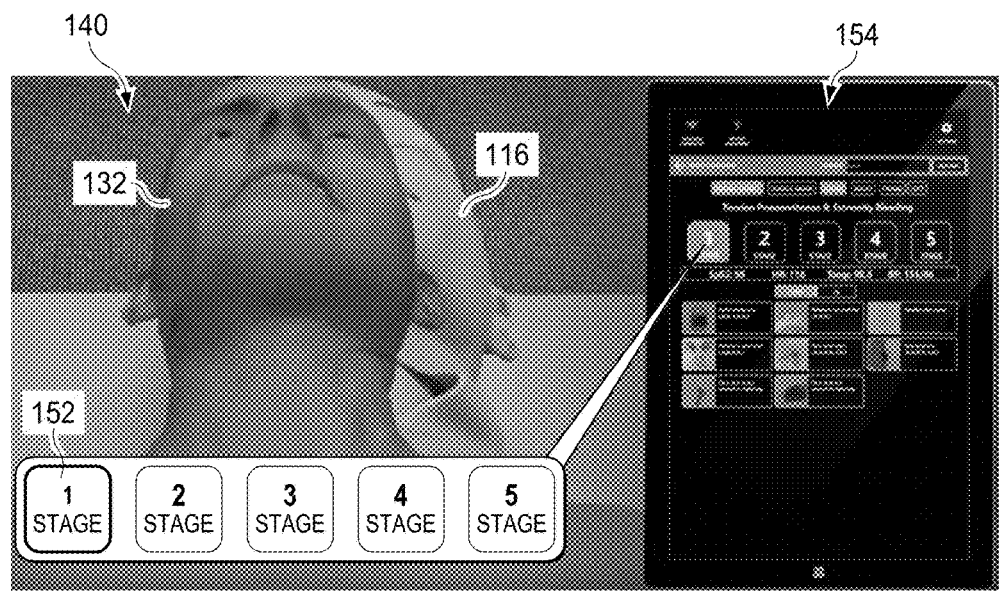
FIG. 13 depicts a screenshot from a command and control communication device according to one embodiment.
Figure 14:
FIG. 14 depicts a screenshot showing a view from a smartglass according to one embodiment.
Figure 15:
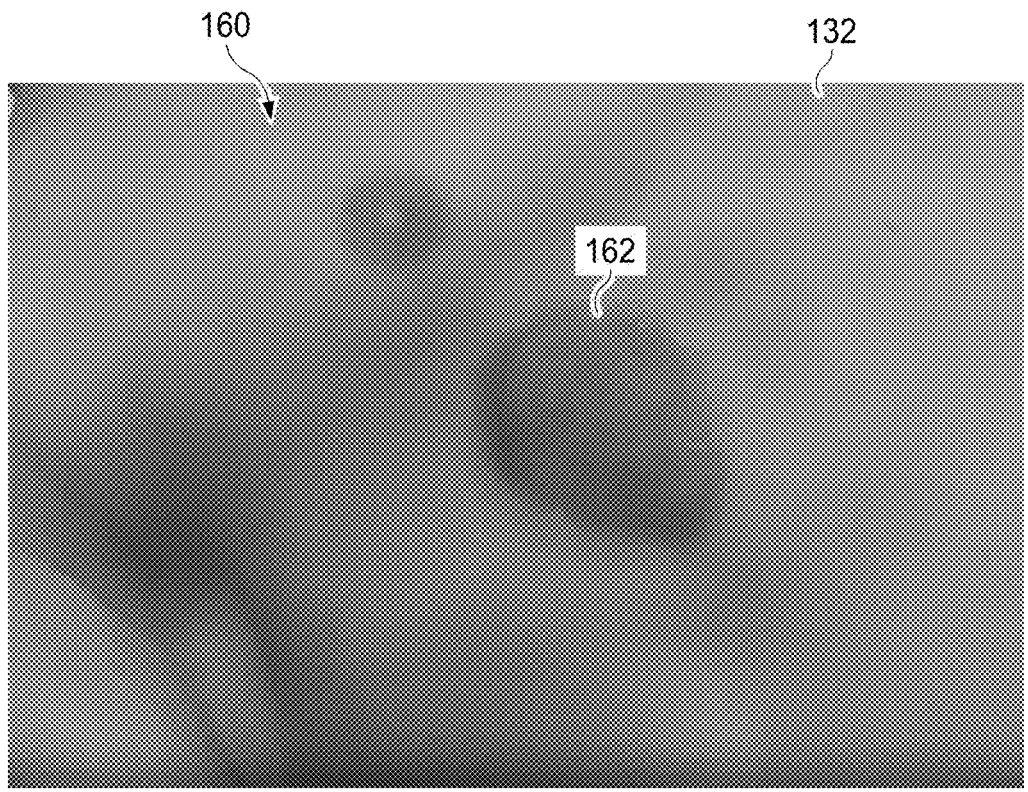
FIG. 15 depicts a screenshot showing a view from a smartglass according to one embodiment.
Figure 16:
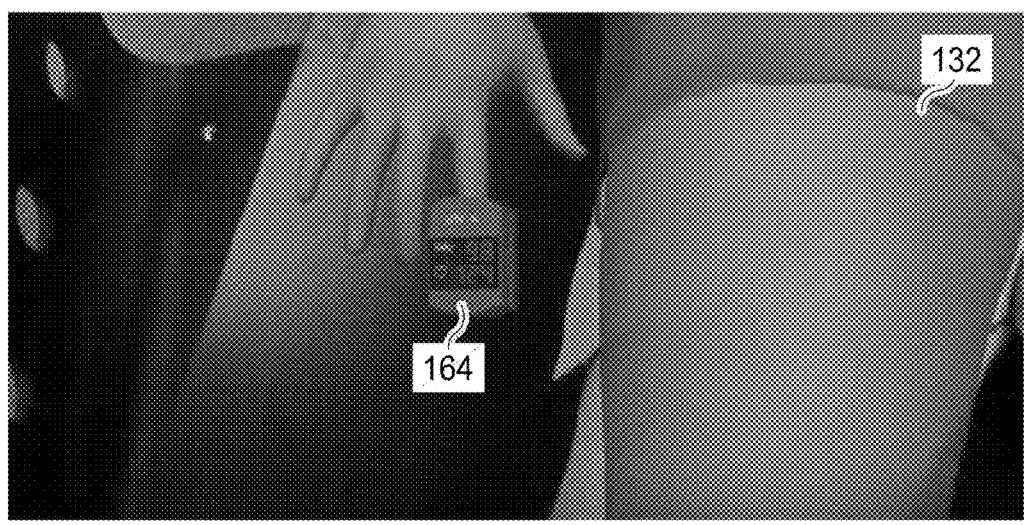
FIG. 16 depicts a screenshot showing a view from a smartglass according to one embodiment.

In an embodiment, a scenario such as Tension Pneumothorax and Extremity Bleeding can be selected by clicking, touching, or voice command, whereupon the virtual patient image 132 will present an appearance of a person in a stage of that condition. For example, as shown in FIG. 13, after selecting the scenario, which can be, as discussed above, called by number, e.g., "Scenario 3," the instructor screen 140 can depict an image 132 of the patient on mannequin 116 (which is shown offset for clarity herein), and the instructor can choose a "stage" 152 of the condition to be presented to the student, for example "Stage 1" as shown in FIG. 13. On another portion 154 of the instructor screen 140 can be presented various medical conditions that a student can be expected to detect on the virtual patient in the stage shown.

From the student perspective, viewing through a smartglass, e.g., a HoloLens, a student view 160 can show a virtual patient 132 in a first stage of tension pneumothorax. As the student move about and inspects the virtual patient in Stage 1, for example, the student can see a chest wound 162 on virtual patient 132, as shown if FIG. 15. The student can also see a virtual image of a peripheral device, such as a blood oximeter 164 that can indicates conditions typical of Stage 1 of tension pneumothorax, such as a blood oxygen level of 98 and a pulse of 124.

Figure 17:
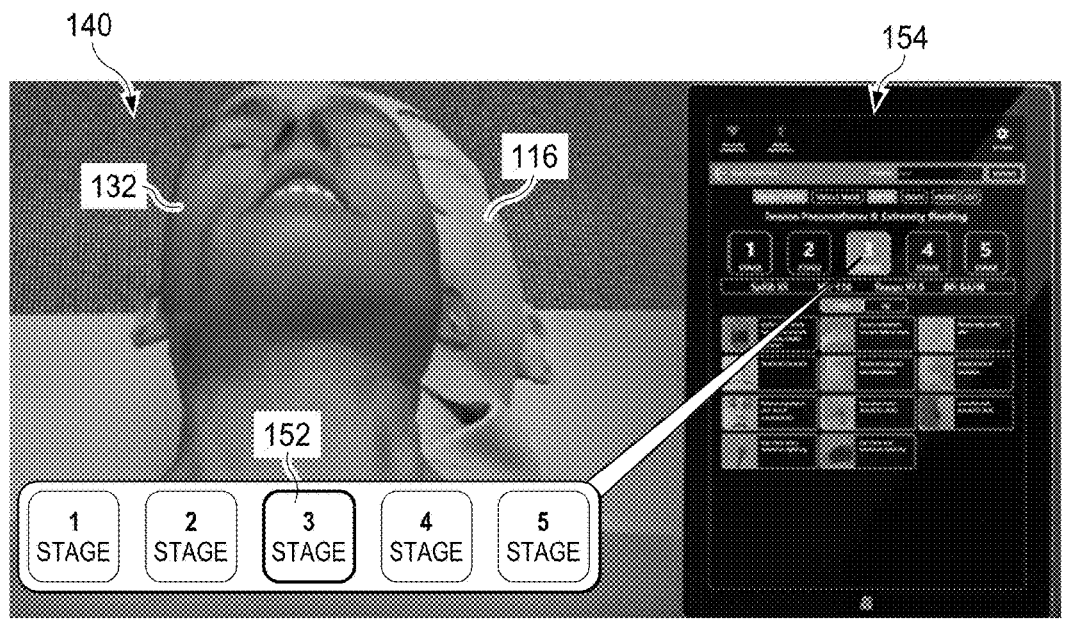
FIG. 17 depicts a screenshot from a command and control communication device according to one embodiment.

In like manner, the instructor can move to other stages 152, such as Stage 3, which is shown in FIG. 17 on the instructor view 140, and which shows new medical conditions 154 presented on virtual image 132.

Figure 18:
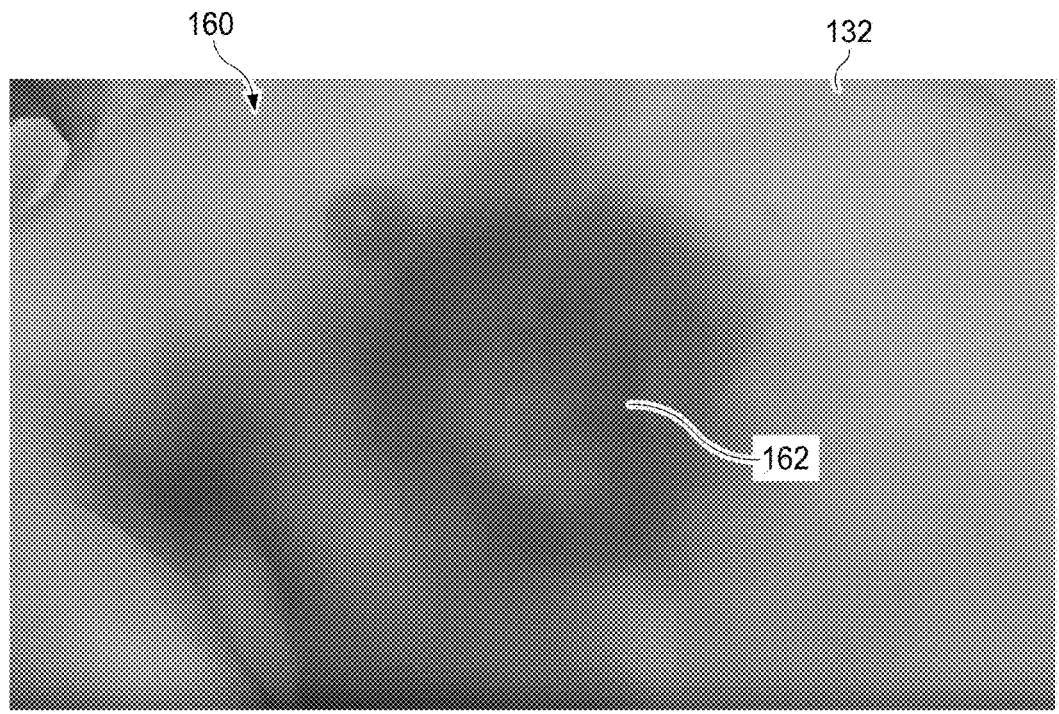
FIG. 18 depicts a screenshot showing a view from a smartglass according to one embodiment.
Figure 19:
FIG. 19 depicts a screenshot showing a view from a smartglass according to one embodiment.

At Stage 3, in the illustrated embodiment, for example, the student view can now depict a worsening chest wound 162 as depicted in FIG. 18, a changing pulse oximeter 164, as shown in FIG. 19, that provides for realistic typical blood oxygen levels of 85 and pulse rate of 130.

Figure 20:
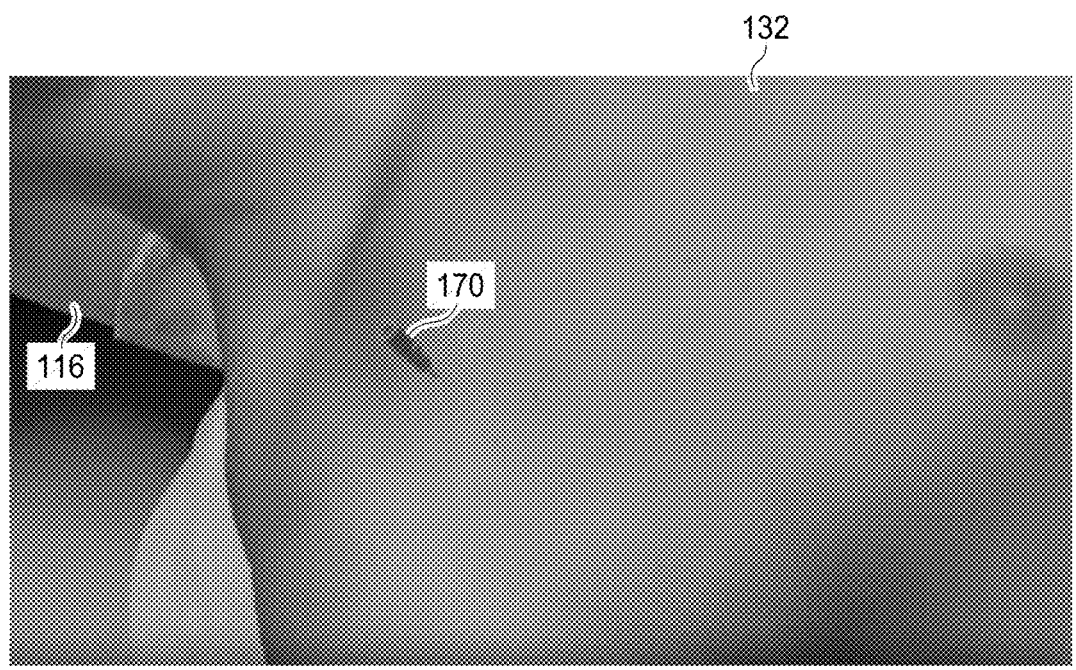
FIG. 20 depicts a screenshot showing a view from a smartglass according to one embodiment.

Because the system, method and apparatus disclosed herein provides for a holistic practice of diagnostic skill development. The training program (e.g., at 203 of FIG. 2) method and apparatus can integrate a virtual patient with a physical patient that permits not only condition identification (e.g., via changes indicated in the virtual patient) as described above, but also direct physical intervention (e.g., on mannequin 116). For example, as shown at FIG. 20, a student detecting and diagnosing tension pneumothorax can perform needle decompression physically inserting an actual needle 170 a into the chest of the physical mannequin 116, such as at the second intercostal space in the midclavicular line.

Figure 21:
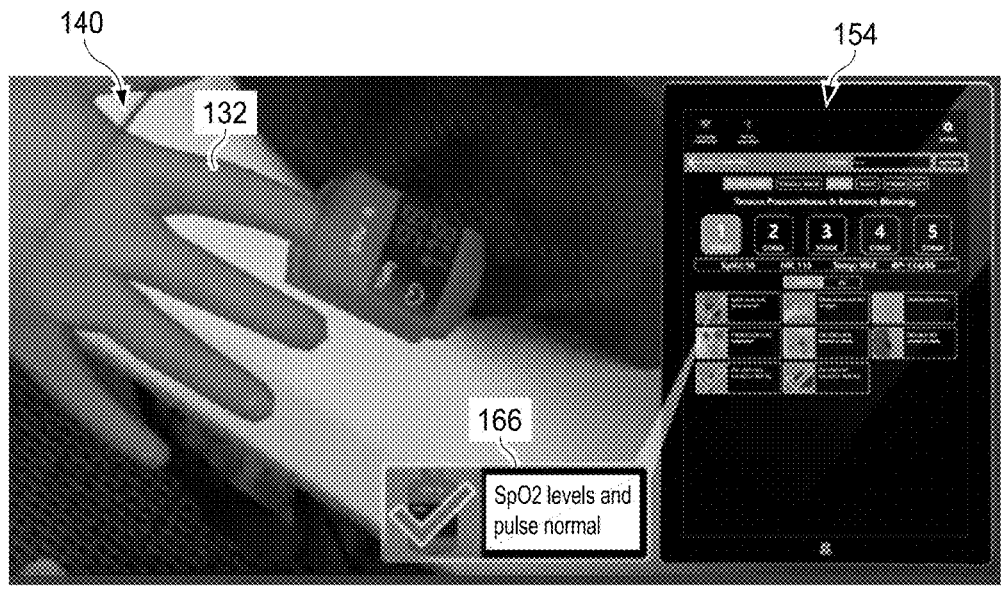
FIG. 21 depicts a screenshot from a command and control communication device according to one embodiment.

As shown in FIG. 21, at every stage, an instructor can see on the instructor view 140 what the student is viewing through smartglass 102, and can indicate, e.g., at 166, successful detection of medical conditions and other visual cues expected to be detected by a trainee.

Referring again to FIG. 2, method 200 can include a Reporting 210. Knowledge gained in Running a Training Program 208 can be incorporated into subsequent development plans specifying anticipated training effects, system performance goals, validation methods, key scientific and technical milestones, and risk reduction activities. Such Reporting can be used to improve the Method 200 for subsequent iterations. In an embodiment, for example, once a training session is complete, the system and method can present a report 168, e.g., on the instructor view 140 of the command and control computing device 104, as shown in FIG. 22.

An evaluation study plan can include details about participants, measures, and analysis strategies, which can be linked to specific learning objectives. In running a training program any suitable educators or caregivers can be recruited as participants such as, for example, emergency medical technicians (EMTs) or EMT instructors. Participants can complete the proposed training program and can complete a short knowledge test, followed by two training scenarios, for example. Scenarios can be used in which the initial situation includes weak signals that are easy to miss. For example, a tension pneumothorax scenario may begin with a police officer who was sliced by a knife between the fifth and sixth rib near the mid-axillary line when breaking up a fight. The wound does not look serious and the police officer brushes it off, saying it is "just a nick." In this situation, it would be easy to miss the possibility of developing a tension pneumothorax. As the scenario unfolds, the presence of a tension pneumothorax can become increasingly visible. After completing the training scenarios, the participants can complete another knowledge test to assess changes in knowledge after the training intervention. They can complete two test scenarios in order to collect objective performance measures and comparisons to the expert model (i.e., macrocognitive measures). Lastly, the participants can complete a usability and usefulness survey. The usefulness survey may aid in assessing whether EMTs judge that the virtual patient reacts as a human would in the real world, and will include comparison to more traditional training platforms.

It will be appreciated from the above description that the system, method and apparatus of the present disclosure can utilize perception-action loops that develop a holistic practice of diagnostic skill development. That is, the system, method and apparatus integrates a virtual patient with a physical patient that permits condition identification (e.g., via changes indicated in the virtual patient) with direct physical intervention (e.g., on mannequin 116). Diagnostic skills can be practiced on the virtual patient and intervention skills can be practiced on the physical patient. The process can be monitored and controlled by an instructor who can control the condition of the patient and assess how the trainee is responding to changing conditions. The perception-action loop can be repeated as necessary for training. In this manner, trainees are able to interact with the physical environment and virtual content seamlessly. This functionality also affords the ability to inject hints and guidance to trainees as they work through training scenarios.

In an embodiment, utilizing the systems, methods and apparatus described herein, a training session can be executed according to the following non-limiting description where unless specified, a user can be one or either of a trainee student or a trainer instructor.

A student user can launch an application on the XR device, which can hold one or more medical scenarios, including time-based conditions, in its resident memory and execute instructions to launch various applications. The XR device allows the user to see and interact with virtual medical patients, either overlaid on medical training mannequins or in stand-alone mode without mannequins. An XR device app utilizes naturalistic user interfaces and interaction controls, for example naturalistic language commands and human gesture controls, to the allow the user to interact realistically with the virtual patient, mannequin, and simulation systems. The simulation systems running on the XR device can be controlled by the student, or remotely by an instructor using command and control device.

The student can initiate start of a session with a voice command, such as "ready for training," and wait for a network connection with the command and control device. The command and control device can make a network connection with the XR device and send and receive commands through a wireless connection. The command and control device can have in its resident memory virtual patient content and can receive one or more scenario files, e.g., from the XR device, and can instruct how to utilize graphical assets for the user. The command and control device can contain complete copies of the one or more medical scenarios, including time-based conditions, loaded and used on the XR device, as well as additional creative assets used to describe the cues, interventions and cognitive scaffolding techniques of the virtual patient simulation system to the users, including a student and instructor.

The command and control device can launch a application from the processor of the mannequin, and can then launch a training application from inside the mannequin application. After registration of the virtual patient on the mannequin the XR device can send and event message to the command and control device that the image is connected and anchored. At this point, a user can call up a list of scenarios on the command and control device. Selection of a scenario sends a message to the XR device load patient information and sends a message back to the command and control device, whereupon stage information can populate on the command and control device. A user can then select a stage, at which time and event message is sent to set the statefullness in the XR device to the selected stage. At this time, a trainee can be viewing visual cues on the virtual patient, the visual cues being virtual images or physical conditions on the mannequin. Using gaze tracking features, the trainer can visualize on the display of the command and control device what the trainee is viewing in real time. A trainer can, for example, confirm on the command and control device that a trainer looked at a visual cue, and "check off" the successful visualization on the command and control device. This process can continue through one or more stages of each scenario, resulting in a record of the visual cues a trainee noticed and/or reacted to. If an physical intervention is being taught, the command and control device can be utilized to prompt, instruct, and/or record any intervention events.

In an embodiment, utilizing the systems, methods and apparatus described herein, a training session can be executed according to the following non-limiting description, where unless specified, a user can be one or either of a trainee student or a trainer instructor.

A user can launch an application on the XR device, which can hold one or more medical conditions in its resident memory and execute instructions to launch various applications. The XR device can allow the user to see and interact with virtual medical patients, either overlaid on medical training mannequins or in stand-alone mode without mannequins. An XR device app can utilize naturalistic user interfaces and interaction controls, for example naturalistic language commands and human gesture controls, to the allow the user interact realistically with a virtual patient, physical mannequin, and simulation systems. The simulation systems running on the XR device can be controlled by the student, or remotely by an instructor using the command and control computing device.

A user can initiate a session with a voice command, such as "ready for training," and wait for a network connection with the command and control device. The command and control device can make a network connection with the XR device and send and receive commands through a wireless connection. The command and control device can contain complete copies of the same virtual patient images loaded and used on the XR device, as well as additional creative assets used to describe the cues, interventions and cognitive scaffolding techniques of the virtual patient simulation system. The command and control device can receive scenario simulation state data and simulated medical patient information from the XR device in real-time, as well as provide visualization tools to help an instructor perceive and understand what the student is seeing and doing on the XR device, granting the user total control of the virtual patient simulation experience.

The command and control software can be portable, and can be used with stand-alone software, or embedded into other software programs. The software can use middleware to bridge between existing mechanical mannequin control systems and the simulation system running on the XR device. This middleware allows a virtual patient and mannequin control systems to synchronize during a simulation exercise, giving the user better holistic understanding and control of what is happening inside the mannequin and on the XR device's virtual patient. For example, changes in the virtual patient's respiration animation can affect the physical mannequin's motorized respiration settings. Additionally, changes in the physical mannequin's motorized bleeding can drive the virtual patient's blood flow on the XR device. Additionally, the command and control device can manage broader aspects of the XR device during a simulation exercise, including knowing the status of the XR device's hardware, network and software systems.

The command and control device can also allow the instructor to the track the student's gaze while using the XR device. This feature allows the instructor to know what, where and when a student is looking during a simulation exercise. Virtual elements associated with critical cues related to medical conditions can be tagged for gaze tracking. For instance, areas of interest on the virtual patient can be tagged to notify the system when an area is being seen by the student. A collection of gaze records can be generated during each training session and stored in the memory of a computing device operating in the system. Time-stamped gaze records can also be created, stored, and managed for each student.

To set up a virtual patient on the XR device (i.e. "Register the Patient") a user can look at image markers, e.g., fiducial markers, attached to the physical mannequin in predetermined locations to trigger the computer vision system. An image detection system running on the XR device can detect the image markers in the real-world environment and translate the image markers into virtual coordinates in a simulation engine. The detected images markers can be captured and associated as coordinates of spatial mapping points generated by the XR device to reliably lock the virtual patient relative to the mannequin. The registration process can be controlled by the user on the XR device with voice commands, or by the user of the command & control system, remotely.

When the XR device user registers the virtual patient, the command and control system can be notified. At this point, a user can call up a list of scenarios on the command and control device. Selection of a scenario sends a message to the XR device to load patient information and content. The XR device receives the message, loads the virtual patient assets, presents the first view to the XR device wearer, then sends a message back to the command and control device, whereupon stage information can populate on the command and control device. A user can then select a stage, at which time and event message is sent to set the statefullness of the simulation running on the XR device to the selected stage.

At this time, a trainee can be viewing visual cues on the virtual patient, the visual cues being medical conditions or subject matter depicted with 3D models and graphical overlays, in-context medical animations and visualizations, 3D spatial sound effects and voice over acting, or medical interventions practiced on the mannequin.

Using gaze tracking features, a trainer can see visualizations on the display of the command and control device of what the trainee is viewing in real time. A trainer can, for example, confirm on the command and control device that a trainer looked at a visual cue, and "check off" the successful visualization on the command and control device. This process can continue through one or more stages of each scenario, resulting in a record of the visual cues a trainee noticed and/or reacted to. If a physical intervention is being taught, the command and control device can be utilized to prompt, instruct, and/or record any intervention events.

In general, in embodiments of the system and method herein, it is possible to combine multiple approaches to improve the registration and tracking of a virtual object mapped to a physical object. For example, by leveraging 2D fiducial markers with simultaneous location and modeling (SLAM) techniques, a fixed location in space can be determined. The location provided by the fiducial markers can then be digitally anchored to an existing spatial map created using other techniques. This feature can be particularly useful in situations where a physical object may be moved from one location to another. By leveraging the power of fiducial markers, a virtual object can quickly be relocated to another position in 3D space simply by reacquiring the fiducial markers—shortening the time needed to construct an entirely new spatial map and re-insert the virtual object. In dynamic training environments, such as tactical combat casualty care and prolonged field care, the value of rapid re-registration of a virtual object to a physical object is dramatically increased.

In general, in embodiments of the system and method described herein, data about a patient's condition can be exchanged between the command and control device (C&C) application and the HoloLens. This data can be made available to be consumed by an external object, such as a medical training mannequin. That data can then be used to create changes in the physical mannequin (e.g., change respiration, heart rate, pulse oximeter levels, etc.). Similarly, the flow of data can also work in the opposite direction. The C&C application can also be configured to accept data from an external object. For example, if a physical mannequin provides state information or property information about the patient's condition, that data could be consumed by the C&C application and transferred to the HoloLens application to mirror the physical patient's state. In general, as disclosed herein according to context, "states" refers to internal models used by the system to hold data, inputs and events, e.g., variables, which collectively can define the behavior of objects in the system. As used herein according to context, "properties" are the values that get transferred between systems and objects. Properties can, in some examples, be thought of as variables.

The system and method described above can benefit from five adaptive training components, as described below.

First, a trainee can receive attention-directing hints. In an embodiment, trainees can see or hear virtual hints and guidance, immediately practice physical interventions, and receive instructor feedback about their actions. In the one example, the hints can be heard as a voice avatar representing a more experienced medic (or physician) encouraging the learner to notice or look for something specific, i.e., Is he bleeding anywhere else? Have you looked inside his mouth to see if the airway is swelling? This approach can enable the trainee to obtain first-hand experiences in the context of challenging cases. This feature can be beneficial for novice and intermediate trainees as this approach provides important scaffolding, and also retains important realism by using a voice avatar of mentor/colleague.

Second, trainees can receive real-time auditory correction, intended to aid the trainee in conducting a thorough assessment using a relevant algorithm. This training component incorporates real-time feedback into the training scenario. For example, many medical schools use the Airway, Breathing, Circulation, Disability, Expose the patient, Foley and rectal (ABCDEF) algorithm, whereas combat medics may use the Massive hemorrhage, Airway, Respirations, Cardiac, Head injury (MARCH) algorithm. When a trainee deviates from an appropriate algorithm (e.g., delays assessing airway because of distracting head injury), an auditory correction can remind the trainee to walk through the assessment in the correct order. This intervention can be beneficial for novice and intermediate trainees.

Figure 23:
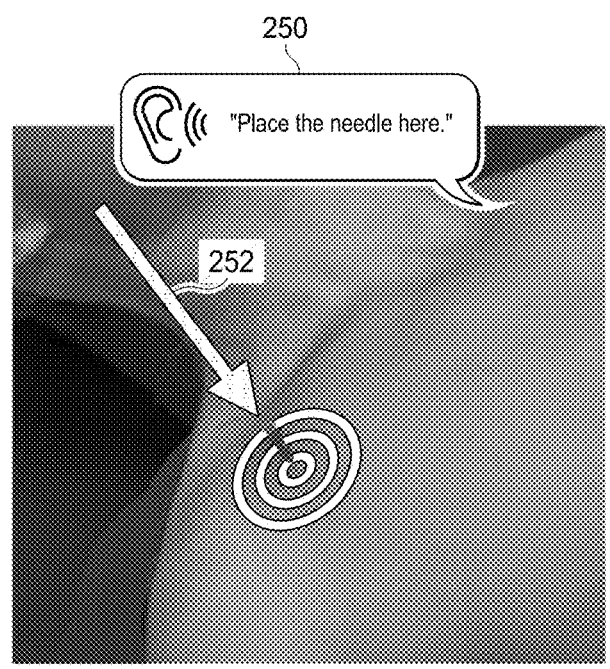
FIG. 23 depicts a screenshot showing a view from a smartglass according to one embodiment.

Third, a training component can include the use of 3D animation to show underlying dynamic anatomy. For example, although a trainee may have read descriptions of what happens inside the chest cavity when a tension pneumothorax develops, seeing an animation of asymmetric chest breathing on a virtual patient image overlaid on a physical mannequin can have added training benefit. By situating instructional animations of injury processes in realistic scenarios, the present system and method can enable trainees to build robust mental models and improve their ability to visualize the implications of the injury, anticipate future states, and identify appropriate treatment options. In another example, a trainee can see a visual pointer. A visual pointer, or cue, might point to an appropriate intervention. As compared to a voice avatar directing the learner to look for signs of airway swelling or describing appropriate needle placement, a pointer on the anatomy can reduce ambiguity for the learner, making it appropriate for beginning trainees. For example, as shown in FIG. 23, a visual cue 250 can appear in the trainee's field of vision via a HoloLens, together with a visual indication 252 of where and how to make an intervention. This intervention can be beneficial for novice and intermediate trainees.

Fourth, the system can manipulate time using AR. For example, a trainee can see how a patient condition degrades over time without medical intervention by compressing time scales. The trainee may see the virtual patient immediately following an injury, and then at whatever time intervals are required to demonstrate the progression of an injury. For a tension pneumothorax, this feature might jump forward several hours, while an airway injury might unfold in a matter of minutes. The trainee can also jump back and forth in time to compare cue representation. For example, the learner might first notice jugular vein distention (JVD) at Stage 4 of a scenario, but wonder if s/he could have noticed it earlier. The learner could then flip back and forth between Stage 2, Stage 3, and Stage 4 to see how the JVD initially appeared, and how far it progressed. This component supports feedback and first-hand experiences.

Fifth, a performance summary can be provided. The performance summary can have three parts: an expert model, a replay, and a performance score. For intermediate and advanced trainees, the performance summary can highlight where trainee performance deviated from the expert model based on gaze tracking data and instructor input. It can then be possible for the instructor to revisit portions of the scenario from the perspective of the trainee. This can allow the trainee to review cues that were missed or misinterpreted. Finally, learners can receive a performance score in which points are awarded for appropriate actions, and subtracted for hints used and errors. The integration of these features into a performance summary can support summary feedback, reflection, and deliberate practice.

It will be appreciated that Augmented/Mixed Reality medical training tools can be used for any suitable applications. Embodiments of the system and method can include an AR-based system that delivers training via Google Tango enabled tablets and Microsoft's HoloLens wearable, for example. Embodiments of the system and method can be a Rapid-Recognition Skills (RRS) trainer. Embodiments of the system and method can be built to help the user learn to rapidly recognize cues that are rare and/or difficult to replicate in the real-world. Using computer-generated visual and audio cues the system can be designed to strengthen the cognitive associations between cues present in rare events and the behaviors needed to respond appropriately to them in complex and dangerous real-world situations. Because embodiments of the system can be portable, the platform can be integrated with live training (force on force) technology.

Embodiments of the system can use 3D depth sensing and spatial mapping technologies to scan the user's environment in real-time, providing the ability to lock virtual content, such as patients and props, into the user's real-world view of the physical space. Embodiments of the system and method can allow for a highly realistic simulation of real-world phenomena.

Embodiments of the system and method can be targeted towards medical first responders. For example, a training module can incorporate a patient with tension pneumothorax, or any other suitable medical condition. The system can be flexibly designed to rapidly incorporate other conditions or situations of interest. Embodiments of the system can include any suitable conditions such as arterial bleeding, tension pneumothorax, and airway issues.

Embodiments of the system can effectively integrate haptic and olfactory cues into the AR trainer to further increase feedback fidelity for learners. The system can also be associated with an authoring tool to support scenario selection and configuration and to address software security. FIG. 24 shows a list of various features, uses, and systems 178 that can be incorporated into embodiments described herein. Applications for this training tool for use in complex health care settings (e.g., emergency response, hospital emergency rooms and surgical environments) are contemplated. Embodiments of the system can include full integration with a mannequin at the manufacturer level. Such an integrated system may create a seamless lock-on between our virtual patient and the physical mannequin, develop conditions and injury states that are aligned with the scenarios already developed for the physical mannequin and, and/or wirelessly synchronize the patient condition with the physical mannequin so that interventions and changes in the physical mannequin are mirrored in the virtual patient.

It will be appreciated that any suitable Mixed Reality (MR) systems can incorporate the training systems described herein. Such systems can elevate existing medical simulation training through the use of mixed reality technologies that can represent high fidelity visual and auditory cues. Embodiments of the system can include a focused and integrated learning solution for both students and instructors, providing a mixed reality virtual patient overlay that can enhance physical medical training via mannequins. Embodiments of the system and method can include a collection of patient medical conditions and stages that the instructor can choose and control on a selectable basis in real time or near-real time, as well as a means to capture and store the student's data throughout a training session.

Example Training Session

The system, methods and apparatus disclosed herein can be used in any suitable environment, but for illustration purposes a non-limiting example use case is provided. Certain differences in the method described in this use case are considered alternative uses and methods inherent in the flexibility of the system, and are not to be viewed as inconsistent with the description above. Olivia, a seasoned combat medicine instructor, is training the Wayne County SRT SWAT Team in the basics of Tactical Combat Casualty Care (TCCC). Today the students are learning about tension pneumothorax. A physical training mannequin is placed on floor of the classroom, to facilitate hands-on portions of the training session. The students stand off to the side as the instructor prepares the simulation space.

First, Olivia makes sure the dedicated Wi-Fi LAN network is up and running. She launches the Command & Control (C&C) app on her tablet, starting up the network server inside the app. She carries the tablet with her as she sets up the other devices. Next she sets up the Data Capture System (DCS), by launching it on her laptop, and clicking the "Connect C&C" button. Moments later the DCS system plays a sound letting her know that it has successfully connected to the C&C app. She glances at the C&C tablet and sees an indicator confirming that the DCS is connected. She sets up the Mixed Reality Client (MRC). She puts on the HoloLens and boots it up, launching the MRC app from the main menu. After the client app launches, it plays a sounds letting her know that it has automatically connected to the C&C app over the network. She glances at the C&C tablet and sees an indicator showing that both the DCS and MRC are connected to the app.

Now that all the hardware is up and running, and the devices are connected together on the network, Olivia can register the HoloLens virtual patient to the physical mannequin. An indicator can appear in the HoloLens viewport prompting her to register the patient to the mannequin, by saying "Register Patient." She says "Register Patient" and a cursor appears in the viewport. The indicator can tell her to place the cursor on the mannequin's pelvis and say "Set Pelvis." A virtual guide can appear on the mannequin's pelvis in the HoloLens view after she says "Set Pelvis," the indicator's text changes, telling her to place the cursor on the mannequin's forehead and say "Set Head." Olivia can move the cursor the appropriate location and says "Set Head," and another virtual guide can appear on the mannequin's forehead. Additionally, a semi-transparent virtual patient guide can now appear overtop the mannequin in the HoloLens viewport. The indicator's text changes, letting her know that she can still move the head and pelvis guides on the mannequin by positioning the cursor and saying "Set Head" and "Set Pelvis" until she's happy with the virtual patient's placement. The indicator also tells her that if she's happy with the placement and ready to start the simulation, she can say "Lock Patient." Olivia says "Lock Patient," the cursor, head, and pelvis guides disappear. The semi-transparent virtual patient guide overlay becomes opaque. The indicator text changes to "Ready to Simulate."

Olivia can glance down at the screen of the C&C app and can see an indicator that lets her know the patient has been registered and that the simulation is ready to run. She can remove the HoloLens and hand it to the first student, Stewie, to run through the simulation. The student can put on the HoloLens and confirm that he can see the virtual patient guide overlay running on the MRC app.

Back in the C&C app, Olivia can click the "Record Training" button. This can create a video file from the HoloLens mixed reality view, as well as record the audio captured from the onboard microphones, each time the she changes the patient condition and stage. The button turns green and starts blinking, indicating that the mixed reality view from the MRC is being captured. Next, she selects "Tension Pneumothorax—Stab Wound" from a menu of available patient conditions. The app screen's UI updates with 4 buttons, showing that this condition has 4 possible stages. She clicks button "Stage 1," then clicks the "Start Simulation" button.

Inside the MRC app's viewport, the virtual patient guide overlay and "Ready to Simulate" text can disappear, being replaced with a realistic looking virtual patient. Stewie walks around the mannequin and sees that the virtual patient's view changes as he moves around the mannequin. The instructor asks the student to describe what he's seeing and thinking as he examines the patient. He kneels down and examines the left side of the virtual patient's chest and sees a shallow stab wound between the 5th and 6th rib intercostal area. He scans the rest of the body and doesn't see any other injuries. He watches the symmetrical rise and fall of virtual patient's chest as it breathes and checks the patient's pulse and blood oxygen levels. Stewie moves around the patient, describing what he's seeing, hearing and thinking. The camera and microphone on the HoloLens can capture what he's seeing and saying, streaming it from the MRC app to the DCS, which can store it for later evaluation.

Olivia moves to the second stage of the patient's condition by clicking the "Stage 2" button on the C&C app, which can load the next piece of patient content in Stewie's MRC viewport. The virtual patient updates, exhibiting new visual and auditory cues including asymmetric rise and fall of the chest, the onset of cyanosis in the extremities, thin skin tissues, and mucous membranes, as well as declining oxygen levels in the blood. Stewie scans different areas of the virtual patient, the hands, the pulse/ox sensor attached to the index finger, the veins around the neck, the coloration of lips, and the motions of the chest as the virtual patient struggles to breath. He hears the patient's labored breathing. As Stewie sees and hears these cues he describes out loud what he's experiencing and thinking to Olivia. The MRC app can capture all of this and stream it to the DCS system.

The training session continues as Olvia steps through different stages of the scenario on the C&C app, sometimes going back and forth between stages to allow Stewie to compare earlier cues to later cues to see the progression in the MRC viewport. Eventually, the instructor concludes the virtual patient simulation, toggling the "Record Training" button off.

Such an example may be useful for basic stages of the training, where the program is heavily balanced toward instructor based teaching cues. When transitioning to the more advanced stages of practice it may be advantageous to provide a list of SME-recognized critical cues on the C&C app to the instructor. This can allow the student to progress and make mistakes without the instructor having to stop the session, or miss out on student's actions, while taking notes.

For example, after splinting a fracture, standard practice is to check pulse, motor function and sensation. If the student correctly immobilizes the injury in a simulation, but fails to reassess the pulse, the instructor could check the splint/sensation/motor function boxes, but could leave the reassess pulse box unchecked. Critical cues/interventions that were missed could be tied to academic standards of the student and/or lessons learned from real-world AARs, journals and articles. It is contemplated that the HoloLens video recording be tied with instructor inputs. The SME recognized critical cues could be tied to currently used pass/fail checklists and individual student performance reports could be generated to document training.

Numerous variations are contemplated, such as showing and hiding the mannequin to allow for medical interventions, representing medical interventions on the virtual patient asset, and a streamlined fiducial marker approach to patient registration. The DCS records for each student can be set up by entering the student's name into the C&C app before starting a training scenario and toggling "Record Training". Having multiple MRC clients involved in a training scenario may incorporate multiple full equipment solutions and multiple instructors. Embodiments of the system and method can support a one-to-many relationship where a single C&C app and DCS system can support multiple HoloLens MRC clients. Embodiments of the system and method can use more than one solution in an environment. Any suitable device registration approach can be used, where for example the system ties into each device's unique MAC addresses, or the like, to facilitate.

Example after Action Review (AAR)

The instructor can review training videos on the Data Capture System (DC S) app. The instructor can scroll through a list of items, which represent individual video files and session data captured from the MRC mixed reality viewport and onboard microphone. Each item in the list can have the following information: Name of student, Name of instructor, Name of school, Scenario name, Scenario stage number, duration of video clip, and date and timestamp when video was captured. The instructor can move the mouse cursor over one of the items in the list and click it, expanding a video window. Playback controls can appear below the video window—Play, Pause, Rewind, Fast Forward and a Jog/Shuttle slider, for example. The timecode for the video can be displayed above the playback controls and can update as the video playhead moves. The instructor can have the option of playing the video full screen.

In one embodiment, to make programming the DCS simpler, it may be useful to watermark the info into the mixed reality video as an overlay in the MRC at runtime. The system can put the timestamp directly into the video versus above the playback controls in one embodiment. Embodiments of the system and method can time stamp the instructor inputs onto the SME-checklist, which could correlate student action, instructor feedback and performance standards into a precise student AAR.

Referring to FIG. 24, any suitable components and elements can be associated with the MR client 180. Certain aspects of an example system are described herein. An example system can include components as those described herein which can work together to provide a seamless learning experience.

Mixed Reality Client (MRC)—Used by the student, the MRC 180 can be a Windows 10 application that can be loaded and running on a Microsoft HoloLens. The MRC can provide the student with a view of the virtual patient with minimal user interface elements.

Command & Control (C&C)—Used by the instructor, the C&C system 182 can be a Windows 10 application that can loaded and running on a Microsoft Surface tablet, for example. The MRC can connect to the C&C system during a simulation session, allowing the instructor to control the content, views, and states of the virtual patient.

Data Capture System (DCS)—The DCS 184 can be a Windows 10 application loaded and running on a laptop computer, for example. The DCS can be used to capture and store data from the MRC during a simulation session. The system can provide an interface for the instructor to browse and watch video captured from the student's point-of-view during training.

Dedicated 5 GHz Wi-Fi Network (LAN)—Hardware associated with the system can connect together through a dedicated high-bandwidth LAN network 186.

Networking—Network Client of Command & Control (C&C) App

The networking setup for the HoloLens client can be made relatively easy and seamless for the end-user. The MRC can automatically connect to the LAN and to the C&C system if it's on the network, and can maintain some level of monitoring of these connections to make sure it's maintained. The system can connect to the C&C app's network server on the LAN through a static address port. Alternatively, the system can listen for broadcasts from the C&C app's network server, automatically connect to C&C app's address, and port dynamically. The system can receive variables from the C&C app (strings, ints, floats, bools, structs, lists), receive commands from the C&C app (ex: set active scenario stage), send files to the C&C app (ex: JSON Scenario List & Scenarios), and/or send callbacks to the C&C app (ex: on change patient stage).

Networking—Network Server for Data Capture System (DCS)

The DCS system can connect with the HoloLens in order to receive video streaming data as well as simple variables, such as the student's name, current training scenario and scenario stage being streamed. The connection between the DCS and MRC can be done automatically, with no intervention from the user, if both devices are on the network and their respective apps are up and running, for example. The system can allow the DCS system to connect to the MRC app's network server on the LAN through a static address. The system can associate with a broadcast network server address and port through the LAN network, which can allow the DCS system to connect dynamically to the MRC app. The system can function to send variables to the DCS app (ex: strings, ints, floats, bools, structs, lists), send commands to the DCS app (ex: prepare to capture video stream), stream mixed reality audio and video to the DCS app, and receive callbacks from the DCS app (ex: on video stream captured).

Data—Localized Content & Variables

Content for the MRC can be loaded from external data 190, such as external JSON files and deserialized in the HoloLens client app. A master Scenario List file 192 can contain local file path references to the individual Scenario definition files. A Scenario definition file can contain references to the local storage property 240 paths of named content elements, such as Unity Asset Bundles, as well as runtime properties for the Scenario, such as the descriptive name of the scenario. These files can be used both by the MRC app, as well as the Command & Control (C&C) app. Additionally, the MRC app can store variables sent from the C&C app, which can then be passed along to the DCS, such as the name of the student and the name of the instructor. The system can function to load JSON files used to build Scenario List (ex: of JSON Scenario files), load JSON files used to build a Scenario (ex: Scenario_Gunshot.json), load/store Unity Player Preferences used to maintain pervasive application variables, receive student's name from C&C app (ex: "John Doe"), receive instructor's name from C&C app (ex: "Jane Doe"), and receive school's name from C&C app (ex: "State University").

Virtual Patient—Scenarios & Content

A Scenario 194 can contain a list of patient artwork assets that can correspond to individual Scenario Stages, as well as descriptive text that can describe the content of the scenario. For instance, a tension pneumothorax scenario might have four stages, thus there can be four patient artwork assets, one associated with each stage of the scenario. The descriptive text for this scenario might be: "Tension Pneumothorax: Knife Stab Wound." The system can function to load a Scenario List which contains index of scenarios [JSON], load active scenarios which contain references to virtual patient assets and total number of patient states for a current scenario [JSON, Unity Asset Bundles), manage states and views of active scenarios, and load and present active virtual patient assets from scenarios.

Virtual Patient—Callbacks

The HoloLens client can communicate its states 198 and status back to the C&C app throughout the course of a training session to keep the systems in synch. This includes notifying the C&C when specific events 212 occur, such as when the scenario has finished loaded, when the patient for a scenario has successfully updated in the viewport, or when an error occurs. This can allow the C&C app to keep track of the active states on the MRC throughout a simulation session. The system can function to MRC connect/disconnect to C&C, DCS connect/disconnect to MRC, load Scenario List (ex: On MRC scenarios loaded, six scenarios available), load Scenario (ex: On MRC scenario loaded: Scenario.GSW), change Scenario, change Scenario Stage (ex: 1, 2, 3 . . . n), start/stop scenario, show/hide patient, mute/unmute patient audio, error (ex: On MRC Error: "Scenario Not Found").

Virtual Patient—2-Point Registration to Physical Mannequin

The process for registering the virtual patient to a physical mannequin can be simple and intuitive. This process may only need to be done once at the beginning of a training session, by the instructor, before the student uses the MRC app. The registration process can involve leveraging the HoloLens' spatial mapping capabilities to place a virtual cursor on the surface of the mannequin's head and pelvis to set anchor reference points which are then used to position, orient, and offset the virtual patient relative to the physical mannequin. The system can use a 2-point manual registration process—Position, align, offset and place the virtual patient relative to the physical mannequin through two reference points (i.e. pelvis & head). The system can provide instructional feedback to guide the user through the process of registering the virtual patient from start to finish. The system can provide visual feedback of pelvis and head reference points in the MRC viewport, for example. The system can provide visual feedback of virtual patient guide after reference points are set in the MRC viewport. The system can show/hide visual feedback during registration process (if desired).

Mixed Reality Data Capture

The MRC can capture the mixed reality view of the student and virtual patient together during the training session. The MRC can leverage the HoloLens' built-in video/audio capture and streaming capabilities to store the student's learning performance, including what the student is seeing and hearing in real-time, as well as what they are saying and thinking as they describe their perceptions and thought processes throughout the training session. The C&C app can provide the student's name and instructor's name to the MRC, which can then pass along this data with the video/audio stream to the DCS system. The system can function to start/stop streaming video and audio of the mixed reality view to DCS app, send HoloLens unique machine ID to DCS app to facilitate record-keeping, send student's name to DCS app (ex: "John Doe"), send instructor's name to DCS app (ex: "Jane Doe"), send school's name to DCS app (ex: "The Farm"), send Scenario name to DCS app (ex: "Arterial Bleeding: Leg Amputation"), and send Scenario Stage number to DCS app (ex: 1, 2, 3 . . . n).

Commands—Respond Commands from the C&C App

The MRC can be remotely controlled by the instructor. The instructor can control the student's entire training experience from the C&C app. The system can be used to set MRC control modes (Local, Remote), set MRC runtime modes (Init, Register Patient, Ready, Simulate, Error), set active Scenario, set active Scenario Stage, show/hide virtual patient art, mute/unmute patient audio, and start/stop streaming mixed reality view.

Commands—Local User Commands

If the instructor allows, there may be some simple MRC commands 214 available to the student during a training session. These commands may not have a visible user interface during training, but can be accessed through voice commands, for example. Example functionality can include show/hide patient view, which may be useful if the student needs to work with the physical mannequin at any point during the training session) and mute/unmute patient audio.

System Feedback

The MRC can provide feedback to the user during the course of a simulation session when important state changes take place and when problems or errors occur. Examples include the loading of a new scenario, the changing of a scenario state, as well as problems with network connectivity. This feedback may be toggled off and on by the instructor. Example feedback can include MRC indication connected/disconnected to network, MRC indication connected/disconnected to C&C, MRC indication DCS is connected/disconnected to MRC, MRC indication streaming mixed reality view to DCS, MRC indication Scenario List loaded, MRC indication Scenario loaded, MRC indication Scenario stage changes, and MRC indication error occurred.

User Inputs

There can be multiple modes available for the student to interact with the MRC systems. The student may do very little direct interaction through the system, as many or most of the features and content may be controlled remotely by the instructor using the C&C app. That said, certain modes may be available to facilitate the patient-to-mannequin registration process 218, setting up the network 220, debugging and troubleshooting 224, as well as operating the MRC in solo mode and navigating the virtual patient content without the C&C app. Example features 226 can include gaze inputs with visual cursor and gestures which can utilize HoloLens' spatial mapping and gaze tracking features through an sdk, speech inputs with voice commands which can use HoloLens' speech recognition through an sdk, gaze and speech inputs with visual cursor and voice commands, network inputs with commands, callbacks and variables which connect to the network, send messages and values, and respond to network based callbacks, and system inputs with events (ex: respond MRC systems events).

Figure 25:
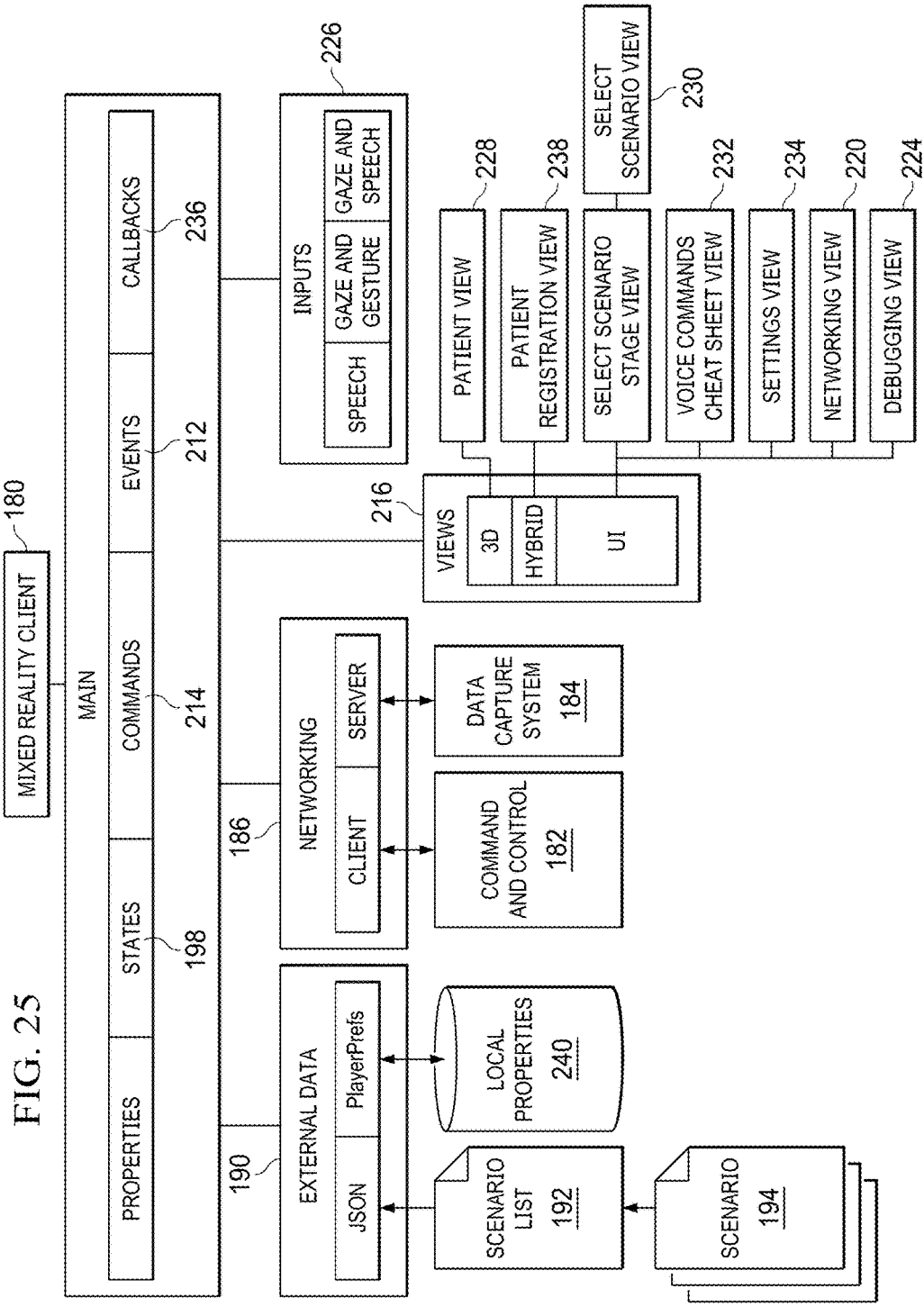
FIG. 25 depicts a chart showing an embodiment of an organization of a system according to one embodiment.

It will be appreciated that any suitable number of views 216 of user interfaces are contemplated, including 3D views, hybrid views, and other user interface views. Example views and interfaces are provided below, with reference to FIG. 25 that describes a Mixed Reality Client (MRC) system.

Patient Scenario View

The MRC can provide a simple user interface (UI) to navigate and activate a patient view 228 from a list of available scenario views 230. The UI can utilize gaze-based and/or voice based commands. Visual hints may need to be present to denote the corresponding voice commands. Functionality can include browse Scenario list and select Scenario.

Patient Scenario Stage View

The MRC can provide a simple UI to select a scenario stage from a number of available scenario stages. The UI can utilize gaze-based and/or voice based commands. Visual hints may need to be present denote the corresponding voice commands. Functionality can include select Scenario Stage Number.

Patient 2-Point Overlay Registration Views

The MRC can provide a structured experience to guide the user through registering the virtual patient to the physical mannequin in a patient registration view 238. This process can use voice commands, a visual cursor tied to the Holo-Lens' spatial mapping capabilities, and some floating UI elements, for example. The UI can utilize both gaze-based and voice based commands. Visual hints may need to be present to denote the corresponding voice commands. Functionality can include Register Patient, where the user initiates the registration process, Place Pelvis Guide, where the user places cursor on mannequin's torso, close to the pelvic floor, and locks a virtual pelvis guide into place, Place Head Guide, where the user places cursor on mannequin's head and locks a virtual head guide into place, Reset Guides which can remove head, pelvis and virtual patient guides, if visible and resets system to initial state, Lock Patient, where this option may be available after the head and pelvis guides are locked into place, and the virtual patient guide appears, Show/Hide Virtual Patient Guide, where once both head and pelvis guides are placed, a semi-transparent Virtual Patient Guide appears, showing the corresponding position, alignment and offset that the virtual patient will have during the simulation. The user can show/hide the Virtual Patient Guide to facilitate adjusting the head and pelvis guides, and Simulation Ready, where the user is finished with the registration process and is ready to move onto simulating.

Networking View

The MRC can connect to the network and C&C app automatically as well as allow the DCS system to connect in as a background process. During testing and development, and as a stop-gap in the event of network problems, this UI can be available to the user to manually configure/setup the network, connect to the LAN or C&C, or start the DCS hosting services. The UI can utilize gaze-based and/or voice based commands. Visual hints may need to be present to denote the corresponding voice commands. Functionality can include Show/Hide Network View, Toggle connect to C&C automatically, Networking status, Display local device IP address & port, Input/Edit IP address and port of C&C Device, where the UI may have an onscreen keyboard or explicit voice command entry for numbers, punctuation marks, "backspace" and "finished", Connect/Disconnect C&C device, Start/Stop network server (for DCS), and Connect/Disconnect DCS device.

Voice Commands "Cheat Sheets" View

The MRC app can support a large number and variety of voice commands. To facilitate issuing these commands, a visual UI can provide a cheat-sheet 232 of voice commands and corresponding keywords. On UI screens that support voice commands outside of the scope of the "Cheat Sheet" UI, voice commands can be worked into the relevant UI. For example, on the "Patient Scenario Stage UI" the buttons to change the scenario stage number can also have hints for the corresponding voice commands—the set stage 1 button will have some visual clue, such as quotes around the button name "Set Stage 1", to denote that it is also the voice command. Functionality can include Show/Hide Voice Command Hints View, Show available voice commands and keywords, and Navigate voice commands menus (next, previous, etc.).

Settings View

The MRC can allow the user to control some of the local app settings 234. Some of these settings may be related to performance profiling, such as providing a view of the current frame-rate. Other settings can affect the user experience, such as toggling the alerts and system feedback from the MRC app, as well as resetting the app's setting to the default values. Visual hints may need to be present to denote the corresponding voice commands. Functionality can include Show/Hide Settings View, Show/Hide system feedback, Show/Hide current student name, Show/Hide frames per second, and Reset local Unity Player Preferences data.

Debug View

The MRC can provide a simple method for developers to see text-based debug and error log information at run-time within the compiled app without the need to be hooked up to a development system running a full-fledged debugger in the debugging view 224. In some embodiments, this may not replace a full-fledged debugger, but may provide some simple functionality to help diagnose problems and errors within a compiled and deployed app. Visual hints may be present to denote the corresponding voice commands. Functionality can include Show/Hide Debug UI, Show/Hide trace log, Show/Hide error log, Scroll trace log, and Scroll error log.

The Data Capture System (DCS) 184 can include any suitable elements, features or functionality.

Networking—Network Client of Mixed Reality Client (MRC) App

The DCS system can be simple and intuitive to set up and can connect to the LAN network 114 and to the MRC client. The process can be automated, with the DCS polling the network and connecting to the LAN and MRC once it's up and running. The system can connect to the MRC app's network server on the LAN through a static address:port. The system can listen for broadcasts from the MRC app's network server, automatically connect to MRC app's address:port dynamically. The system can function to receive video/audio stream from the MRC app, receive variables from the MRC app (strings, ints, floats, bools, structs, lists), receive commands from the MRC app, and send callbacks to the MRC app Data The DCS can store data locally on the host device's hard drive. There can be a localized database to facilitate organizing all of the training data into browsable records. This database can be of standard format and design, with the ability to migrate the records and data into a cloud-based storage solution. The video files can be accessible through the Windows File Manager, allowing the user to copy video files off of the device. The DCS can encode and create a file from the video/audio stream being received from the MRC app. The video codec format can be standard and well supported, such as H264/MPEG-4 AVC. The amount of compression applied to the video file can balance quality with file size, although the system can maximize the storage space on a laptop. Additional data can be captured from the MRC app, including the unique hardware ID from the device sending the data, the name of the student, name of the instructor, name of the school, name of the Scenario and number of the scenario stage will need to be captured and stored as well. The video can also be timestamped with the date/time it was created. All this data can be added to the metadata of the stored video file, or at the very least, incorporated into the filename of the video file. Functionality can include capture and store video/audio streams from MRC, compute available storage space, capture and store scenario data from MRC, capture name of student, name of instructor, name of school, scenario name, Scenario stage #, duration of video clip, date and timestamp when video was captured, HoloLens device ID, date/Timestamp for when capture started, and date/timestamp for when capture ended.
Commands The functionality of the DCS can include browsing a list of student training records, viewing the details of the records, and playing back video. Since there may be hundreds, if not thousands of records or more, there can be a simple mechanism to sort and filter the records to make it easier for an instructor to hone in on the relevant data. Functionality can include Show/Hide active video stream from MRC, Show/Hide active student name using MRC, Create student record, Browse list of student records, Filter list of student records based on keywords, Select student record in list, Control selected video playback, Play, Pause, Stop, Fast-forward, Rewind, Jog/Shuttle video, and Update current timecode.
System Feedback During Data Capture The DCS can provide system feedback during a data capture session. Feedback can include notifications that the system has connected and disconnected from the network and host MRC device, that the system is currently receiving video/data from the MRC, that the system has successfully created and stored a student record, and when the system encounters an error. Functionality can include Indication DCS connected/disconnected from the network, Indication DCS connected/disconnect from the MRC, Indication DCS is receiving video/data stream, Indication DCS has successfully captured and stored the data and video stream, Indication DCS that storage space is running low, Indication DCS error occurred.
Callbacks to MRC The DCS system can transmit states and status events back to the MRC app. These callbacks 236 can include a notification when the DCS has successfully connected to the MRC, DCS status at key times during a video/data capture session, and when an error has occurred on the DCS. Functionality can include DCS connect to the MRC, DCS start receiving video stream, DCS finished receiving video stream, DCS video file successfully created and stored from stream, and DCS error.
Inputs The DCS system can have a few modes of input to control the system. The first mode can be local, when the user is interacting with the system to browse and view records. This can be facilitated using a mouse or similar pointing device on the host system. The second mode can be through remote commands from the MRC system, which trigger actions and stream video/audio data and values through the network to the DCS system. Functionality can include touch inputs with user interactions and network inputs with callbacks (i.e. change in MRC state).

It will be appreciated that the DCS can include any beneficial views or user interfaces. Examples of such views and interfaces are described herein.
Preview Capture Student Data View During a video capture session, the DCS can provide the feedback that video/data is successfully being captured. A preview of the video/data can be displayed onscreen to verify the system is working as expected. Previewing functionality may affect performance, so there can be an option to toggle it on and off, or pick a lower-resource intensive method. Functionality can include Show available storage space left, Show name of student, Show name of scenario, Show stage of scenario, Show live video, and Toggle video preview Off/On
Browse Student Records View The DCS can provide a clean interface to browse and view student records. Since there may be hundreds, if not thousands of records or more, there may be a need for a mechanism to filter and sort the information to make it manageable for an instructor to quickly find specific student records, as well as delete records and video files if they run out of storage space. Example functionality can include Show available storage space remaining, Scrollable list of student records, Scenario data visible in list view of student records, Student name, Date of record, Scenario name, Scenario stage, Input box to filter the list view with keywords (ex—student name, scenario name, etc), Show/Hide video file associate with student record, and Delete record(s).
Watch Video File View The DCS can provide a mechanism for the user to playback video files in a window and in fullscreen mode. There are control mechanisms that can allow the user to play, pause, stop, rewind, fast-forward the video, as well as jog and shuttle the video using a slider. Functionality can include Play, Pause, Stop, Rewind, Fast-forward, Jog/Shuttle video forward and backward, Update timecode of selected video as it changes, and Toggle fullscreen.
Settings UI The DCS Settings UI can allow for setting properties that control the functionality of the app. Functionality can include Set video streaming parameters, Set video storage location, and Set video storage remaining warning threshold.
Debug View The DCS Debug UI can allow the user to display information that can be used to troubleshoot the deployed app. Functionality can include Show/Hide Debug View, Show/Hide trace log, Scroll trace log, Show/Hide error log, and Scroll error log.
Example Technical Specifications/Requirements Certain non-limiting specifications and requirements for the system, method and apparatus of the disclosure are described below.
Mixed Reality Client (MRC) HoloLens App The MRC app can be developed for Microsoft's HoloLens platform. The HoloLens app can be installable through the Windows Store and through side-loading (for development & testing). The HoloLens app can be developed using Unity 5.5.2 (or newer) and C#. The HoloLens can use frameworks that are compatible with UWP/WSA features and functions that can work within the Unity development environment. Unity 5.5.2 currently supports .NET 2.0/3.5 Framework Profile and C# version 5. Final patient art and audio assets can be incorporated using Unity's AssetBundle system. Any custom networking services and features can be wrapped in C# for use in the Unity development environment.
Command & Control (C&C) App The C&C app can be developed for a Microsoft Surface Pro style tablet (or comparable brand). The C&C app can be developed in Microsoft Visual Studio (or comparable/compatible IDE), and be deployed/managed using Microsoft's Windows Store or if possible, as web app. The C&C app can be installable through the Windows Store and through side-loading (for development & testing). The C&C app can share a screen with an existing app which is used to interface and control the physical simulation mannequin hardware.

The C&C app and the associated app can run side-by-side in a split screen mode configuration.

Data Capture System (DCS) App

The DCS app can be developed for a Windows 10 Laptop that can support video capture and a large volume of internal data storage. The DCS app can be developed in Microsoft Visual Studio (or comparable/compatible IDE), and be deployed/managed using Microsoft's Windows Store, or if possible, as web app that can access localized storage and a DB for captured data and video content. A local database can be created on a laptop to store the captured data. Embodiments of the system and method can migrate this data online (cloud) as desired. The video codec used for encoding can be standard and common, not requiring problems with sharing the video outside the DCS system. For example, .H264/MPEG-AVC. The video files can be accessible outside the DCS system (through Windows File Manager, for example). Embodiments of the system and method can allow a preview of the mixed reality video feed during capture. Portability of video data and database data is contemplated.

It will be appreciated that versions described herein can be scaled or modified in any suitable manner. The solution can support multiple Wi-Fi LAN, multiple HoloLens (MRC), multiple Surface Tablets (C&C), and/or multiple Windows 10 Laptops (DCS). Multiple solutions can be operating in the same environment in certain embodiments.

Networking Considerations

The network can be run on a dedicated 5G wireless LAN. The LAN may not be connected to the internet, and may only serve to connect the various local devices/machines in the training solution together. The devices can operate within the optimal range of the wireless LAN. Embodiments of the system and method can use UDP, TCP or a combination of both for network communications. UDP can probably be used for video/audio streaming of content involved in capturing the mixed reality view from the HoloLens. UDP or TCP can be used for sending variables, messages and commands between the Mixed Reality Client app, the Command & Control app and the Data Capture System app. Systems and configurations are contemplated that work across all devices, provide reliable communications, keep network latency low, and use the least amount of resources on each device.

Mixed Reality Capture on HoloLens

During mixed reality capture, the HoloLens system may down-throttle to a max of 30 Hz (i.e. 30 fps) refresh rate. This can degrade performance and cause the experience to suffer (inducing judder and requiring lower-quality visuals). Any suitable approach to overcome this is contemplated such as capturing low res video, or only capturing audio (if relevant) to reduce the load on the device. HoloLens may have a 5 minute limit to the duration of video capture, which can be considered when architecting the data capture approach, although systems with different limits are contemplated.

Windows 10—Universal Windows Platform/Windows Store Apps (for Business)

It is believed that all systems authored for the Proteus solution can work as native Windows 10 apps, to ensure hassle free interoperability, installation/upgrades, management, and maintenance, using Microsoft's Enterprise tools.

It will be appreciated that a variety of systems, applications, and features are contemplated. Examples of such features and systems can include the following:

1) Benchmarked database of trainee responses using naturalistic decision-making (NDM) framework to train rapid recognition skills. Embodiments of the systems described herein can include session data (time stamped system actions, gaze tracking, video and audio) captured during a training session. Sessions can be built around scenarios that have been constructed based on the special needs of the training population (e.g., military populations place high value on airway obstruction, tension pneumothorax injuries, and exsanguination types of scenarios). The session data may include structured prompts to elicit specific responses from trainees. These prompts can be developed based on the NDM framework around which the entire tool has been developed. The actual trainee responses to the prompts, along with the session data that is automatically captured (e.g., audio, video, gaze tracking) can be aggregated and normed to provide meaningful benchmarks.

2) Biometric-based assessments of individual trainee and group trainee performance. There has been widely disseminated research that has been done showing the degradation curves of cognitive and physical performance that comes with increased physiologic stress. In certain embodiments, students can be outfitted with biometric tracking equipment during training to allow for assessments of specific cognitive performance as physiologic stress is increased. There are at least two potentially important uses of such data. First, the scenario performance data (e.g., speed to diagnose, proper identification of key cues, correct intervention chosen, etc.) can be paired with the biometric data for any given student to highlight areas of deficiency and opportunities for specific additional instruction. Second, the combination of performance and biometric data can be normed across all students where it can be used for personnel selection (to aid in identification/selection for advancement), and at the team/unit/group level to create a clearer picture of total readiness.

3) Multi-point registration to match virtual and physical mannequin. A virtual mannequin can overlaid across the top of the physical mannequin using 2-point registration as described herein. The user can points a reticule or cursor at the physical mannequin's head to lock in a head registration point. The user can then place a second point at the pelvis of the physical mannequin and place another registration point. The registration can then be locked in place and the virtual mannequin can be made visible, thus obscuring the physical mannequin. This multipoint registration concept can be extended in a variety of ways. For example, the user can use the reticule/cursor method to manually place registration points on any articulating joint of the physical mannequin and through a collection of registration points, improve the alignment of the virtual mannequin with the physical mannequin. Alternatively, sensors can be placed on (or in) the physical mannequin that could be detected by the registration module to lock in the precise location of head, torso, and all extremities. In addition to sensors that broadcast data about the mannequin, registration could also be accomplished by placing passive, fiducial markers at each articulating joint of the physical mannequin, which could then be "seen" via computer vision and stored in the system. Embodiments of the system and method can incorporate a skeleton tracking capability and/or 3D scanning of the mannequin (building a JSON-formatted archive file or .HAR file with a library of poses) to marry the virtual patient registration overlay data with the physical mannequin tracking data. It will also be appreciated that augmented ultrasound is contemplated. For example, RFID chips can be integrated onto/in the physical mannequin in anatomical locations representing underlying organs such as the lungs, heart, liver etc. Augmented reality can allow for creation of symptoms associated with non-visible internal injuries such as hepatic hematoma, pleural effusion, and accumulation of free air in the thoracic cavity. An RFID chip reader can be altered to meet the physical specifications of an ultrasound machine and can give clinicians the ability to assess their patients in an accurate manner. Changes in the patient's condition can be represented through various stages on the augmented ultrasound monitor screen. A NDM/SME framework can drive the student's cue recognition and learning objectives.

4) Data capture using field-based, small computing systems. It may be beneficial to provide a low-cost/low-power computing platform, (i.e. the Raspberry Pi or Edison), and create a low-level custom video/data capture software. Such a system may provide a turn-key solution for other uses (e.g., small form factor, remote data capture capability). Instead of a Windows laptop, as described herein, a small networkable Linux device could be used in the field that runs on battery power. To get data from the device, a number of options exist, including copying it through a WIFI network, or utilizing the devices onboard USB ports. Some evaluation of the data can be performed locally and can feed data wirelessly back to the Command and Control module to further tailor the training experience (e.g., the trainee has only reviewed 3 of the 10 relevant visual benchmarks on the patient). Embodiments of this device can be cloud-connected and allow for immediate transfer and be ready for subsequent remote access and further analysis. Example devices can also be hooked up to a monitor and keyboard and used like a normal computer, to browse and review records.

5) Additional sensory input integrated into the system (e.g., scent). Embodiments of the virtual system, when paired with a physical mannequin, can allow students to gain expertise through visual cues (e.g., mottled skin), audio cues (e.g., raspy breathing) and tactile cues (e.g., finding a bleeding artery and putting a tourniquet on it). Beyond these three senses additional senses can be stimulated. For example, the system can incorporate small canisters in and around the physical mannequin to release scents during training sessions. These scents may be related to the condition itself (e.g., a chemical smell consistent with a chemical burn injury) or may be just environmental (e.g., blood and vomit smells), to increase the level of stress and realism of the training. The scent canisters can be controlled via the user interface for the virtual system and can be timed to release scent at times that would be appropriate for various conditions that might arise during a given scenario.

6) Tailored asset development and incorporation into the training system. Developing a sense of connection with simulated patients is often challenging. Getting students to see the patient as more than just a piece of plastic (or a collection of pixels) can be an important part of creating training that is absorbed and retained. Embodiments include a portable tool that can allow administrators to capture images of individuals with whom the trainee has a connection (e.g., a member of his/her unit) and put that persons "face" and/or other characteristics onto the virtual patient. Such a system can be small enough to travel to an on-site location where "local patient data" could be captured and integrated into the system. Examples can build on existing photogrammetry techniques already used to build the core model of the patient, where the portable tool can incorporate highly customized images into the full 3-D model to personalize the patient model. Such systems may increase student engagement in the training process and may lead to better training outcomes.

7) Mechanical simulation integration. Embodiments of the system and method can capture the inputs provided to the physical simulation mannequin (e.g., SO2, respiration rate, heart rate) and incorporate those inputs directly into the virtual patient where they may be used to alter the virtual patient's appearance or responses and/or be displayed on overlaid interventions (e.g., a virtual pulse oximeter on the finger). A few, selected virtual patient states may be provided manually, when the instructor requests them. But such Embodiments of the system and method can allow that process to happen automatically and with a much greater number of virtual patient states.

8) Hand gesture detection to assess appropriateness of physical interventions. Embodiments of the system and method can capture the physical interventions that students make on the physical patient. One embodiment would include building a recognition library of medical hand gestures and then capturing student data using radar technology such as Google's Project Soli. Alternatively, the system could include a sensor-based feedback system that could be embedded into the mannequin itself. A library of sensor feedback based on location and pressure can be used to establish whether or not the student was making an appropriate medical intervention.

9) Mass casualty opportunities. Embodiments of the AR system can allow for an extensible platform to include multiple wounded patients and supporting contextual props (e.g., explosions, collapsed buildings, etc.) simultaneously. The system can include computer vision detection of multiple systems operating in a geo-fenced area of operation. Physical mannequins and other elements in the environment can be Bluetooth low-energy enabled to allow for detection by trainee wearable system. When a stimulus was detected, for example, the trainee can receive presentation of the augmented reality stimulus via head-worn display. All systems can be tracked by a command and control system to track all trainee's and their interaction with all stimuli.

10) Mixed reality—human moulage overlay on live people. Through the use of fiducial markers (e.g., images, stickers), Embodiments of the system and method can present patient conditions that can be presented on live humans.

11) NDM affordance, scaffolding. These tools include an adaptive tutoring framework to present multiple, highly salient cues to less experienced students and fewer, harder-to-detect cues for more experienced trainees. In addition, design elements can be provided that serve as scaffolds to ensure that the student is oriented to see the patient in a way that is consistent with the expert POV.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A system for training a student in medical condition identification and intervention, the system comprising:
   a wearable mixed reality viewing device, the wearable mixed reality viewing device comprising a non-planar viewing surface, a first wireless transceiver, and a first processor, the first processor comprising a first memory and;
   a computing device, the computing device being in a wireless client-server based relationship with the wearable mixed reality viewing device, the computing device comprising a substantially flat display screen, a second wireless transceiver, and a second processor, the second processor comprising a second memory;
   a physical object, the physical object being in a first location and comprising a third processor and a third wireless transceiver, the physical object being in wireless communication with the computing device, and wherein the physical object comprises moveable internal components being responsive to wireless communications from the computing device to present visually perceptible movement of the physical object;
   one or more fiducial markers placed in a predetermined position on a surface of the physical object;
   wherein one of the wearable mixed reality viewing device and the computing device comprises non-transitory computer-readable medium having in memory executable instructions for:
      storing a fixed location in space, the fixed location being in known relationship to the one or more fiducial markers;
      translating one or more points from the one or more fiducial markers in a non-depth camera point-of-view from the wearable mixed reality viewing device to one or more anchor points related to a 3D spatial map generated by the wearable mixed reality viewing device;
      anchoring a virtual image of at least a portion of a virtual patient to the fixed location, the virtual image being viewable on both the wearable mixed reality viewing device and the computing device;
      storing a scenario in the memory of the first processor, the scenario comprising parameters for visualization of the medical condition in the virtual patient and comprising a plurality of stages, each stage representing a time-based state of the medical condition;
      storing the scenario in the memory of the second processor;
      selecting the scenario, the selected scenario being transmitted as parameters of the virtual image to the first processor of the wearable mixed reality viewing device and to the third processor of the physical object;
      commanding the second processor to initiate displaying the virtual image in a selected one of the plurality of stages, whereupon the virtual image is viewed in a three dimensional augmented reality view on the non-planar viewing surface of the mixed reality viewing device and in two dimensions on the substantially flat display screen of the computing device, the virtual image presenting one or more virtual critical cues corresponding to the time-based state of the medical condition;
      commanding the physical object to present movement corresponding to one or more physical critical cues of the time-based state of the medical condition;
      assessing a student's identification of the one or more virtual critical cues, wherein assessing the student's identification of the one or more virtual critical cues comprises monitoring the augmented reality view on the substantially flat display screen of the computing device, thereby by gaze tracking determining that one or more of the one or more virtual critical cues was viewed sufficiently to indicate identification; and
      assessing the student's identification of the one or more physical critical cues.

2. The system of claim 1, further comprising executable instructions for, upon moving the physical object to a second location, anchoring the virtual image to the physical object in the second location.

3. The system of claim 1, wherein the mixed reality viewing device is head mounted and comprises a holographic processing unit with head-tracking capability.

4. The system of claim 1, wherein the physical object is a mannequin.

5. The system of claim 1, wherein the physical object is a portion of a mannequin and the one or more fiducial markers comprise an image selected from the group consisting of an image of a tattoo.

6. The system of claim 1, wherein the one or more virtual critical cues comprise cues selected from the group consisting of skin color, vein appearance, bruise appearance, skin swelling, eye movement, mouth movement, blood, saliva, and combinations thereof.

7. The system of claim 1, wherein the one or more physical critical cues comprise cues selected from the group consisting of chest movement, pulse rate, and combinations thereof.

* * * * *